US012407955B2

(12) United States Patent
Muto et al.

(10) Patent No.: US 12,407,955 B2
(45) Date of Patent: Sep. 2, 2025

(54) PHOTOELECTRIC CONVERSION APPARATUS AND SYSTEM

(71) Applicant: CANON KABUSHIKI KAISHA, Tokyo (JP)

(72) Inventors: Hiroyuki Muto, Kanagawa (JP); Hideo Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 18/350,065

(22) Filed: Jul. 11, 2023

(65) Prior Publication Data

US 2024/0022838 A1 Jan. 18, 2024

(30) Foreign Application Priority Data

Jul. 15, 2022 (JP) .................. 2022-113654

(51) Int. Cl.
| | |
|---|---|
| *H04N 25/77* | (2023.01) |
| *H04N 25/59* | (2023.01) |
| *H04N 25/617* | (2023.01) |
| *H04N 25/671* | (2023.01) |
| *H04N 25/709* | (2023.01) |
| *H04N 25/79* | (2023.01) |

(52) U.S. Cl.
CPC .................. *H04N 25/77* (2023.01)

(58) Field of Classification Search
CPC .... H04N 25/59; H04N 25/617; H04N 25/618; H04N 25/671; H04N 25/709; H04N 25/79; H10F 39/8037; H10F 39/802; H10F 39/811; H10F 39/813; H10F 39/809; H10F 39/18
See application file for complete search history.

(56) References Cited

U.S. PATENT DOCUMENTS

| 7,468,750 | B2 | 12/2008 | Mabuchi et al. |
|---|---|---|---|
| 7,688,371 | B2 | 3/2010 | Koizumi et al. |
| 7,990,440 | B2 | 8/2011 | Kobayashi et al. |
| 7,995,127 | B2 | 8/2011 | Koizumi et al. |
| 8,431,879 | B2 | 4/2013 | Mabuchi et al. |
| 8,710,558 | B2 | 4/2014 | Inoue et al. |
| 8,884,391 | B2 | 11/2014 | Fudaba et al. |
| 9,088,743 | B2 | 7/2015 | Koizumi et al. |

(Continued)

FOREIGN PATENT DOCUMENTS

| JP | 2000-165754 A | 6/2000 |
|---|---|---|
| JP | 2002-077730 A | 3/2002 |

(Continued)

*Primary Examiner* — Marly S Camargo

(74) *Attorney, Agent, or Firm* — Venable LLP

(57) ABSTRACT

A photoelectric conversion apparatus includes a plurality of pixels arranged in a matrix, and a control circuit configured to control the plurality of pixels. Each of the plurality of pixels include a photoelectric conversion unit configured to generate a signal charge, a floating diffusion unit, a transfer transistor configured to transfer the signal charge to the floating diffusion unit, and a transistor configured to be electrically connected to the floating diffusion unit. The control circuit outputs a row selection pulse configured to select the pixel arranged in a row direction, and a pixel control pulse having a rise time longer than a rise time of the row selection pulse. The pixel control pulse is entered to a gate of the transistor.

27 Claims, 17 Drawing Sheets

(56) References Cited

U.S. PATENT DOCUMENTS

| | | | |
|---|---|---|---|
| 9,264,641 | B2 | 2/2016 | Kobayashi |
| 9,305,954 | B2 | 4/2016 | Kato et al. |
| 9,357,122 | B2 | 5/2016 | Kususaki et al. |
| 9,407,847 | B2 | 8/2016 | Maehashi et al. |
| 9,438,828 | B2 | 9/2016 | Itano et al. |
| 9,509,931 | B2 | 11/2016 | Kobayashi et al. |
| 9,521,343 | B2 | 12/2016 | Mabuchi et al. |
| 9,602,752 | B2 | 3/2017 | Kobayashi et al. |
| 9,860,471 | B2 | 1/2018 | Mabuchi et al. |
| 10,015,430 | B2 | 7/2018 | Kobayashi et al. |
| 10,609,316 | B2 | 3/2020 | Kobayashi |
| 11,268,851 | B2 | 3/2022 | Kobayashi et al. |
| 11,431,929 | B2 | 8/2022 | Kobayashi et al. |
| 11,463,644 | B2 | 10/2022 | Soda et al. |
| 11,470,275 | B2 | 10/2022 | Kobayashi et al. |
| 11,496,704 | B2 | 11/2022 | Sato et al. |
| 11,616,925 | B2 | 3/2023 | Kobayashi et al. |
| 11,653,114 | B2 | 5/2023 | Nakazawa et al. |
| 11,688,755 | B2 | 6/2023 | Kobayashi |
| 11,736,813 | B2 | 8/2023 | Kobayashi |
| 11,961,856 | B2 * | 4/2024 | Kwag ................ H10F 39/8023 |
| 2002/0054390 | A1 | 5/2002 | Koizumi et al. |
| 2005/0001915 | A1 | 1/2005 | Mabuchi et al. |
| 2005/0052554 | A1 | 3/2005 | Sakurai et al. |
| 2007/0145239 | A1 | 6/2007 | Mheen et al. |
| 2016/0373669 | A1 | 12/2016 | Ando et al. |
| 2021/0136305 | A1 | 5/2021 | Oguro et al. |
| 2021/0360180 | A1 | 11/2021 | Saito et al. |
| 2022/0053151 | A1 * | 2/2022 | Hwang ................ H10F 39/802 |
| 2022/0247964 | A1 | 8/2022 | Kobayashi |
| 2022/0303484 | A1 | 9/2022 | Kobayashi |
| 2022/0303485 | A1 | 9/2022 | Kobayashi et al. |
| 2022/0303486 | A1 | 9/2022 | Kobayashi |
| 2022/0321812 | A1 | 10/2022 | Kobayashi et al. |
| 2023/0041974 | A1 | 2/2023 | Kobayashi |
| 2023/0069364 | A1 * | 3/2023 | Hayashi ............ H10F 39/8037 |
| 2023/0070568 | A1 | 3/2023 | Kobayashi et al. |
| 2023/0072715 | A1 | 3/2023 | Kobayashi |
| 2023/0117988 | A1 | 4/2023 | Kobayashi et al. |
| 2023/0154963 | A1 | 5/2023 | Kobayashi et al. |
| 2023/0171514 | A1 | 6/2023 | Kobayashi |
| 2023/0178580 | A1 | 6/2023 | Yamazaki et al. |
| 2023/0179890 | A1 | 6/2023 | Kobayashi et al. |
| 2023/0216459 | A1 | 7/2023 | Kobayashi et al. |
| 2023/0247332 | A1 | 8/2023 | Kobayashi et al. |
| 2023/0282654 | A1 | 9/2023 | Kobayashi |
| 2024/0006451 | A1 * | 1/2024 | Ichino .................. H10F 39/813 |
| 2024/0128285 | A1 * | 4/2024 | Ikedo ................ H10F 39/8037 |
| 2024/0406591 | A1 * | 12/2024 | Lim ...................... H10F 39/813 |

FOREIGN PATENT DOCUMENTS

| | | |
|---|---|---|
| JP | 2004-320592 A | 11/2004 |
| JP | 2009-518850 A | 5/2009 |
| JP | 2017-202328 A | 11/2017 |
| JP | 2021-072522 A | 5/2021 |

* cited by examiner

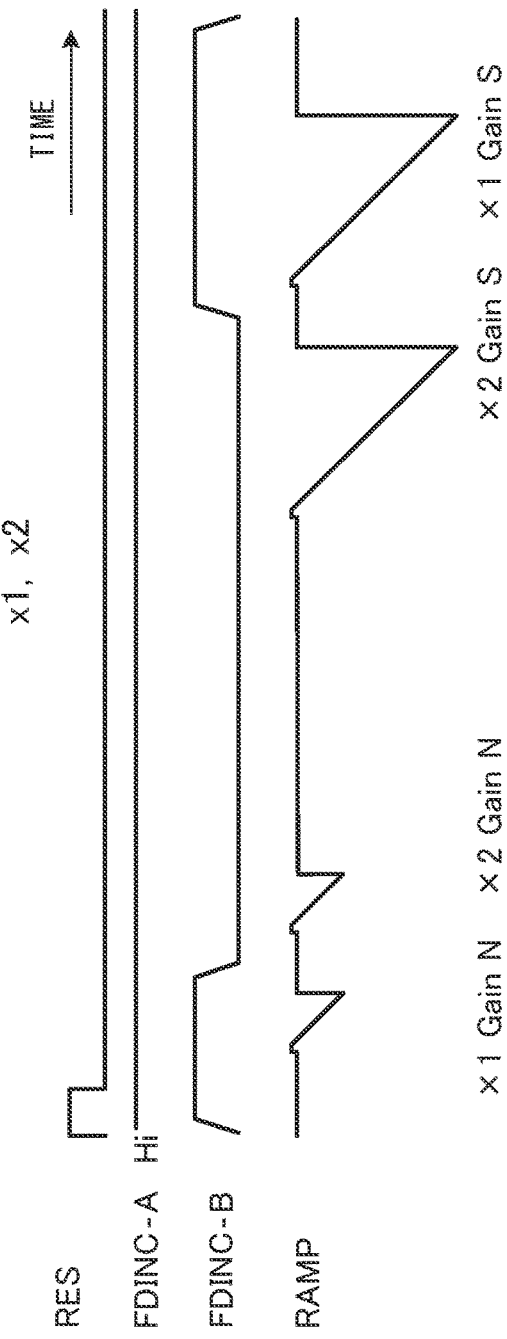
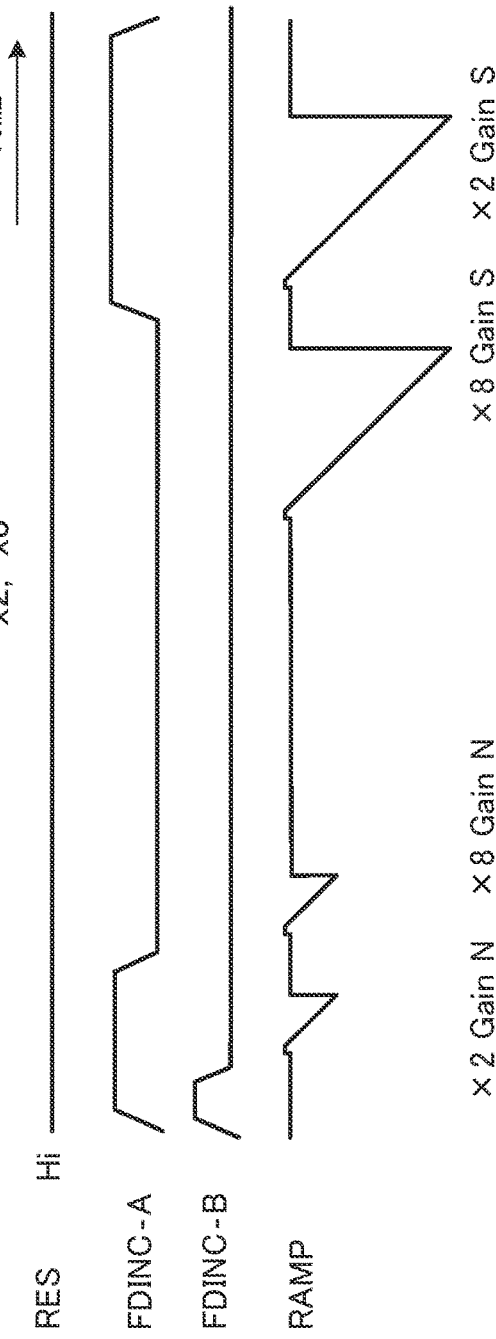

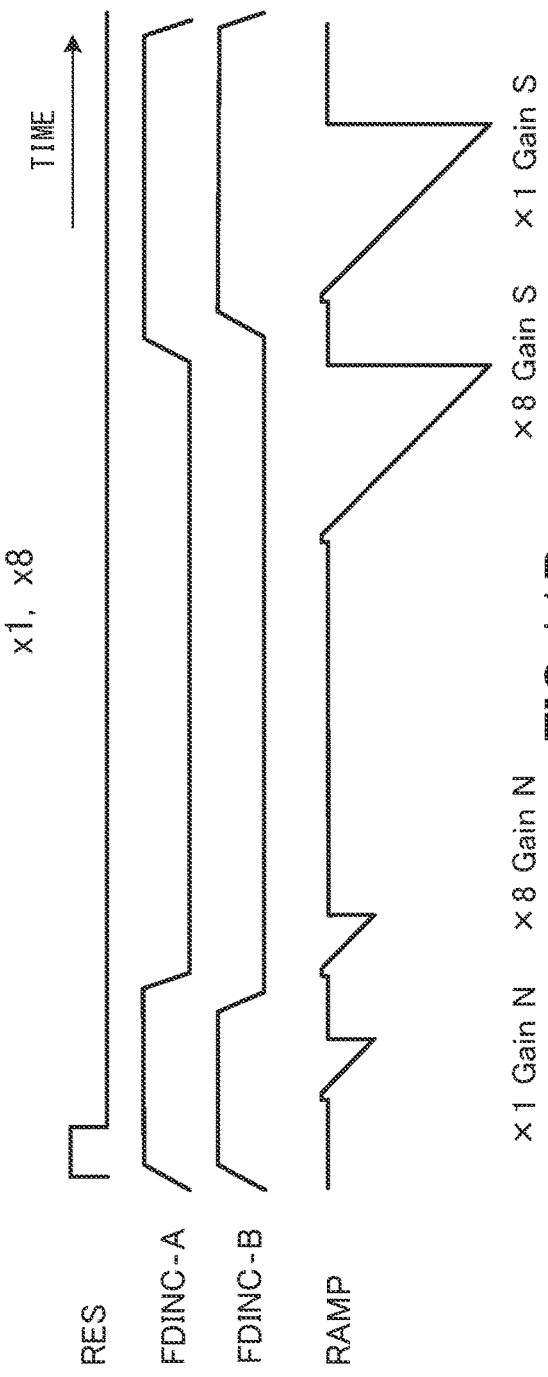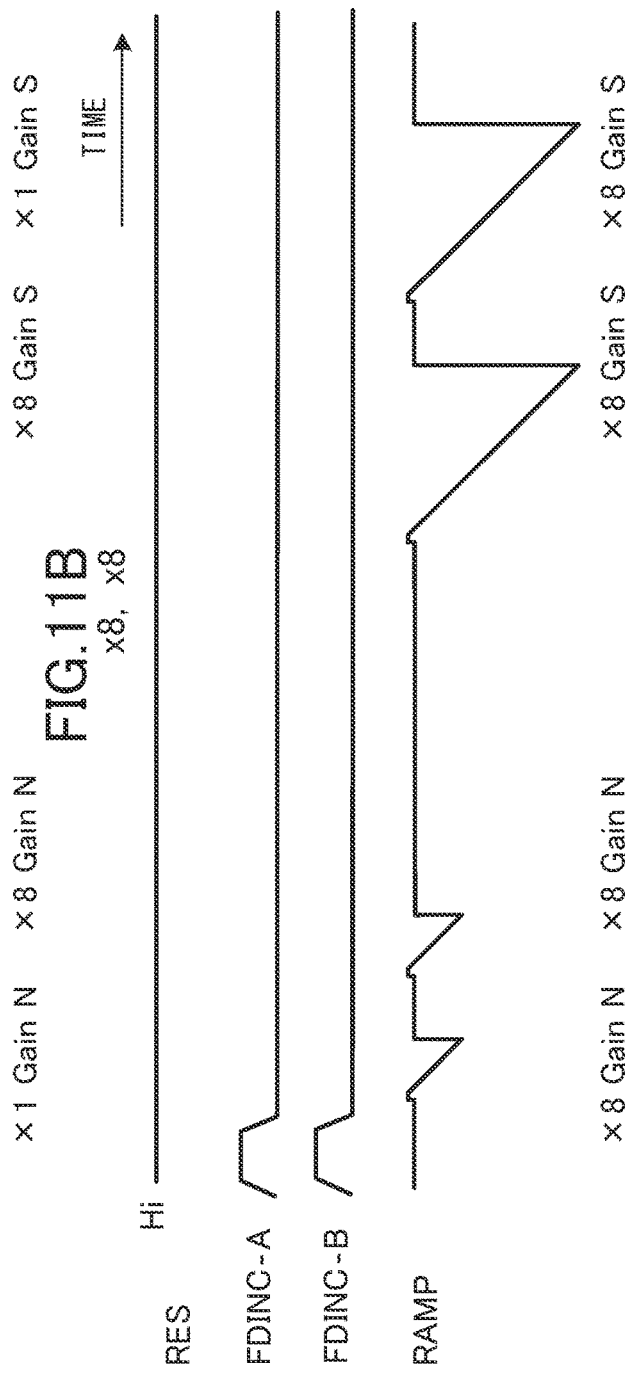

FIG.12

| FDINC-A | FDINC-B | CONVERSION GAIN |
|---|---|---|
| L (456A : OFF) | L (456B : OFF) | × 8 |
| H (456A : ON) | L (456B : OFF) | × 2 |
| H (456A : ON) | H (456B : ON) | × 1 |

PHOTOELECTRIC CONVERSION APPARATUS AND SYSTEM

BACKGROUND OF THE INVENTION

Field of the Invention

The present invention relates to a photoelectric conversion apparatus and a system thereof.

Description of the Related Art

Hitherto, imaging apparatuses such as digital still cameras and digital camcorders adopt a photoelectric conversion apparatus in which pixels composed of a light receiving element and a plurality of transistors are arranged two-dimensionally. Various driving methods are carried out in the photoelectric conversion apparatus to improve the quality of the image being captured.

Japanese Patent Application Laid-Open Publication No. 2004-320592 discloses a method in which a transition time, i.e., fall time, where a voltage of a drain wire common to all pixels is brought to an off state is made longer compared to a transition time where the voltage of a reset wiring or a transfer wiring is brought to an off state, so as to prevent occurrence of saturation shading effect and dynamic range reduction.

Japanese Patent Application Laid-Open Publication No. 2002-77730 discloses, when turning a transfer switch of a pixel from an on state to an off state, generating a control signal of the transfer switch that maintains a third level for a predetermined period of time so as to reduce noise and image lags.

Japanese Patent Application Laid-Open Publication No. 2000-165754 discloses a method for reading a signal having a high sensitivity but a small dynamic range and a signal having a low sensitivity but a large dynamic range from each pixel by switching readout modes. In the photoelectric conversion apparatus, when control signals for controlling a plurality of pixels simultaneously are applied, the rising of the control signals may cause a large current to be flown transitionally, possibly causing erroneous operation of pixels and damaging the wiring.

SUMMARY OF THE INVENTION

According to a first aspect of the present invention, a photoelectric conversion apparatus includes a plurality of pixels arranged in a matrix, and a control circuit configured to control the plurality of pixels. Each of the plurality of pixels include a photoelectric conversion unit configured to generate a signal charge, a floating diffusion unit, a transfer transistor configured to transfer the signal charge to the floating diffusion unit, and a transistor configured to be electrically connected to the floating diffusion unit. The control circuit outputs a row selection pulse configured to select the pixel arranged in a row direction, and a pixel control pulse having a rise time longer than a rise time of the row selection pulse. The pixel control pulse is entered to a gate of the transistor.

According to a second aspect of the present invention, a photoelectric conversion apparatus includes a plurality of pixels arranged in a matrix; and a control circuit configured to control the plurality of pixels. The control circuit outputs a row selection pulse configured to select the pixel arranged in a row direction, and a pixel control pulse having a rise time longer than a rise time of the row selection pulse, and having a fall time longer than a fall time of the row selection pulse.

According to a third aspect of the present invention, a photoelectric conversion apparatus includes a plurality of pixels arranged in a matrix, and a control circuit configured to control the plurality of pixels. Each of the plurality of pixels include a photoelectric conversion unit configured to generate a signal charge, a floating diffusion unit, a transfer transistor configured to transfer the signal charge to the floating diffusion unit, and a transistor configured to be electrically connected to the floating diffusion unit. The control circuit outputs a row selection pulse configured to select the pixel arranged in a row direction, and a pixel control pulse having a transition time from a signal level to set the transistor as OFF state, to a signal level to set the transistor as ON state, longer than a transition time of the row selection pulse from a signal level to set the pixel as unselected state to a signal level to set the pixel as selected state. The pixel control pulse is entered to a gate of the transistor.

Further features of the present invention will become apparent from the following description of exemplary embodiments with reference to the attached drawings.

BRIEF DESCRIPTION OF THE DRAWINGS

FIG. 10A is a timing chart of a case in which signal is read out by voltage conversion gain of ×1 and ×2 according to the second embodiment.

FIG. 10B is a timing chart of a case in which signal is read out by voltage conversion gain of ×2 and ×8 according to the second embodiment.

FIG. 11A is a timing chart of a case in which signal is read out by voltage conversion gain of ×1 and ×8 according to the second embodiment.

FIG. 11B is a timing chart of a case in which signal is read out by voltage conversion gain of ×8 and ×8 according to the second embodiment.

FIG. 12 is a table illustrating a relationship between combination of high (H)/low (L) of floating diffusion capacitance control signals and voltage conversion gain according to the second embodiment.

DESCRIPTION OF THE EMBODIMENTS

Figure 1:
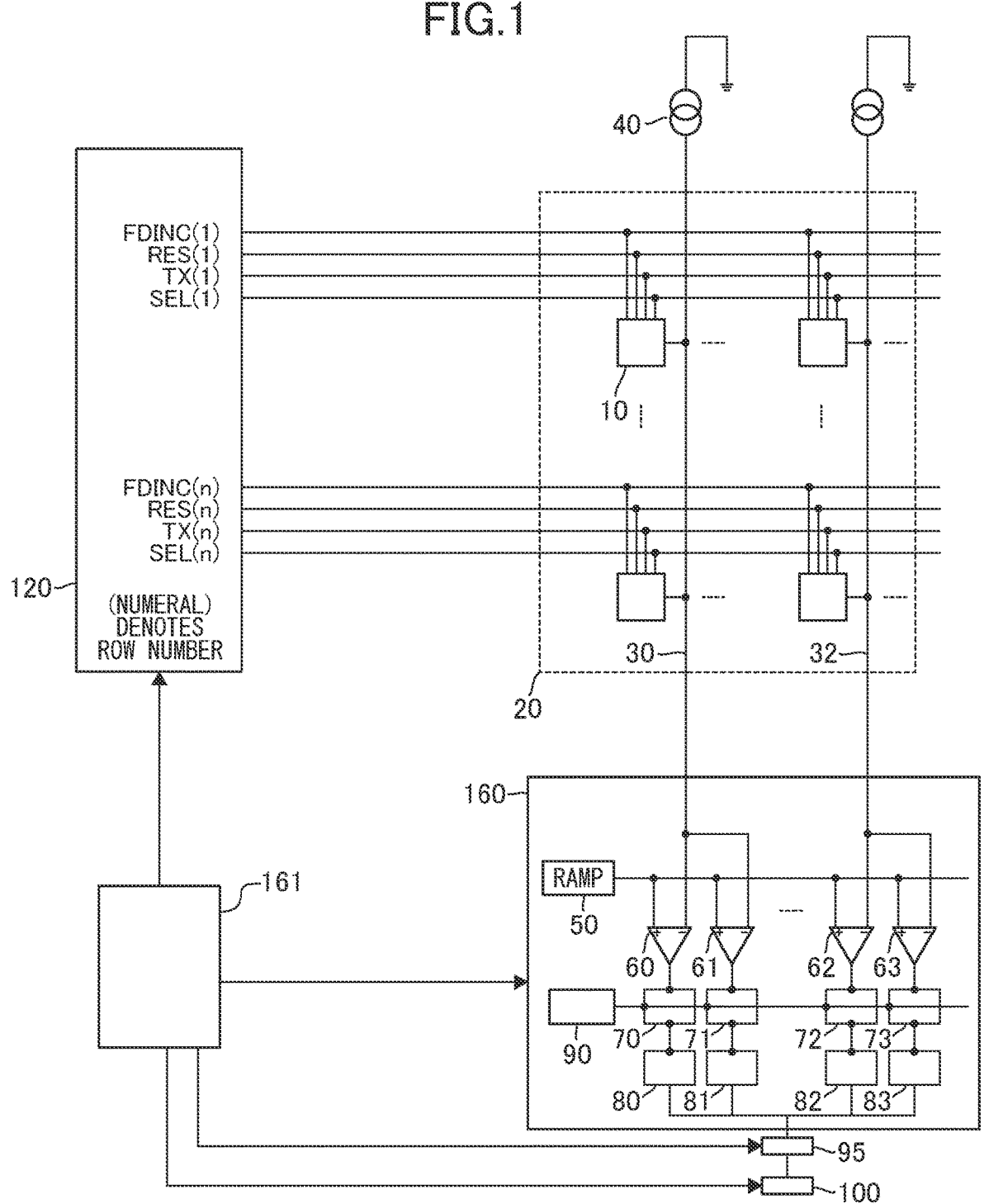
FIG. 1 is a view illustrating a circuit arrangement of a photoelectric conversion apparatus according to an embodiment.

A photoelectric conversion apparatus according to an embodiment of the present invention will be described below with reference to the drawings. The photoelectric conversion apparatus described in respective embodiments described below is not limited to imaging purposes. For example, the apparatus is applicable to an apparatus for measuring distances such as a focusing apparatus that adopt focus detection or Time Of Flight (TOF), or a light metering apparatus such as an apparatus for measuring an incident light quantity.

Conductive type of transistors described below in the embodiments is only an example, and the conductive type is not limited to the type described in the embodiments. The conductor type disclosed in the embodiments can be varied arbitrarily, and gate, source, and drain potentials of the transistor can be varied arbitrarily accompanying the change. For example, in a case of a transistor that is operated as a switch, low level and high level of potential supplied to the gate can be reversed from the explanation of the embodiments accompanying the change of conductive type.

The embodiments illustrated below are examples, and for example, those skilled in the art can change detailed arrangements and execute the present technique without deviating from the scope of the present invention.

In the drawings referred to in the following description, unless stated otherwise, elements denoted with the same reference numbers exert similar functions. The drawings are illustrated in frame format for sake of easier understanding, such that they may not strictly correspond to actual shapes, sizes, and arrangements. In the drawings, if a plurality of identical elements are arranged, reference numbers in the drawing and descriptions thereof may be omitted. Further, in the description of arrangement of pixels illustrated in the drawings, "row" denotes lateral arrangement and "column" denotes vertical arrangement.

First Embodiment

FIG. 1 illustrates a circuit arrangement of a photoelectric conversion apparatus according to a present embodiment.

The photoelectric conversion apparatus includes a pixel array 20 in which pixels 10 are arranged in a matrix, wherein the pixels 10 arranged in a row direction is connected to a pixel control circuit 120 through a common wiring, i.e., control signal line, extending in the row direction. Further, the pixels 10 arranged in a column direction are connected to an AD conversion circuit 160 and current sources 40 through a vertical line 30, i.e., output line, extending in the column direction.

The pixel control circuit 120 outputs respective controls signals, which are an FDINC that controls switching of capacitance of floating diffusion of a pixel, an RES that controls on/off of a reset transistor, a TX that controls on/off of a transfer transistor, and an SEL that controls on/off of a selection transistor, to each row of pixels. In FIG. 1, row numbers of pixels are denoted in brackets at the end of the control signal name.

The AD conversion circuit 160 and the current source 40 are circuits for reading analog signals from pixels of each column through the vertical line and converting them into digital signals. The AD conversion circuit 160 includes a ramp signal supply circuit 50, comparators 60 to 63, first memories 70 to 73, second memories 80 to 83, and a counter 90.

The comparators 60 and 62 each compare signals from vertical lines 30 and 32 with ramp signals output from the ramp signal supply circuit 50. At a timing at which output from the comparators 60 and 62 are varied, the first memories 70 and 72 obtain a count signal from the counter 90. Further, at a timing at which output from the comparators 61 and 63 are varied, the first memories 71 and 73 obtain a count signal from the counter 90. Thereby, signals output from the pixels 10 to the vertical line are subjected to AD conversion. The digital signals from the first memories 70 to 73 are transferred to the second memories 80 to 83, and thereafter, output to a processing circuit 95 as a result of AD conversion.

The processing circuit 95 is a processing unit that is capable of performing a signal processing, such as correction processing, to the digital signals output from the AD conversion circuit 160. An output circuit 100 for outputting the processed digital signals to an exterior is connected to the processing circuit 95. In the present embodiment, an example is illustrated of a circuit arrangement in which a common counter 90 is used in a plurality of circuits, but an arrangement can be adopted in which a common count clock is provided and a counter is arranged in each circuit corresponding to each vertical line. In such an arrangement, there is not only one counter 90, and the counters are arranged to correspond to each of the first memories 70 to 73. It is also possible to have a part of the bits of the count signal transmitted from a common counter to the first memories 70 to 73 and to have other parts of the bits of the count signal generated by counters provided for each of the circuits corresponding to each vertical line. The present embodiment adopts a circuit arrangement in which two comparators are provided for one vertical line so as to enable output signals of different gains to be obtained. The AD conversion circuit is not limited to the type of circuit illustrated in the drawing, and other types of circuits can be adopted.

Further, the photoelectric conversion apparatus is equipped with a timing generator (TG) 161. The TG 161 controls the drive timings of the pixel control circuit 120, the AD conversion circuit 160, the processing circuit 95, and the output circuit 100.

Figure 2:
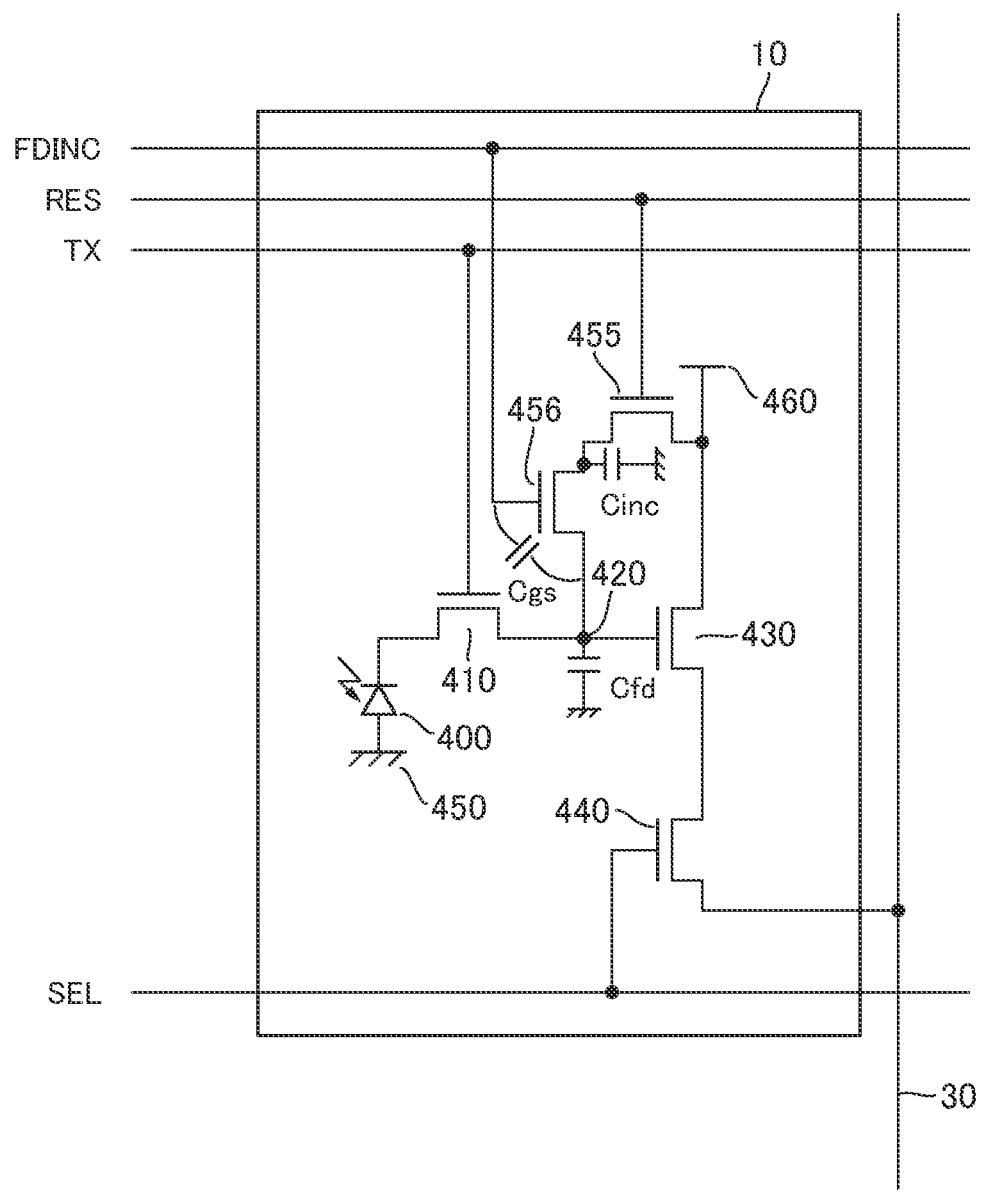
FIG. 2 is a view illustrating a circuit arrangement of a unit pixel according to a first embodiment.

Next, a unit pixel serving as a component of the pixel array 20 will be described with reference to FIG. 2. FIG. 2 illustrates a circuit arrangement of the pixel 10, but other pixels adopt a similar circuit arrangement. The pixel 10 includes a photodiode 400, a transfer transistor 410, a floating diffusion 420, a source follower transistor 430, a selection transistor 440, a GND node 450, a reset transistor 455, a gain switching transistor 456, and a power supply node 460.

The photodiode 400 serving as a photoelectric conversion unit generates signal charge corresponding to the received light quantity. The transfer transistor 410 serving as a transfer unit is a switch, i.e., transistor, capable of switching the on/off of electrical connection of the photodiode 400 and the floating diffusion 420. For example, in a case where the signal charge generated at the photodiode 400 is transferred to the floating diffusion 420, the transfer transistor 410 is turned on. The transfer transistor 410 is driven by a transfer unit control signal TX.

The floating diffusion 420 has a storage capacitance Cfd and temporarily retains signal charge transferred from the photodiode 400 via the transfer transistor 410, and functions as a charge voltage conversion unit to convert the retained signal charge into a voltage signal.

The reset transistor 455 serving as a reset unit is a switch, i.e., transistor, that is turned on/off by a reset unit control signal RES. Further, the gain switching transistor 456 serving as a capacitance switching unit is a switch, i.e., transistor, that is turned on/off by a floating diffusion capacitance control signal FDINC.

For example, when resetting charge of the floating diffusion 420, the reset transistor 455 and the gain switching transistor 456 are turned on simultaneously, and the floating diffusion 420 and the power supply node 460 are connected.

Further, by turning the gain switching transistor 456 to an on state while the reset transistor 455 is in an off state, a gate capacitance Cinc of the capacitance switching unit can be added to the storage capacitance Cfd of the floating diffusion 420. Thereby, the output signal can be read in a state where the sensitivity is low but the dynamic range is wide. That is, in a state where the gain switching transistor 456 is switched to the on state or the off state, the storage capacitance of the floating diffusion unit can be changed and the gain of voltage conversion can be switched. The floating diffusion unit described above refers to the entire capacitance for temporarily retaining a signal charge being transferred from the photodiode 400. That is, in a case where the gate capacitance Cinc is added to the floating diffusion 420, the floating diffusion 420 and the gate capacitance Cinc serve as the floating diffusion unit. The gain switching transistor 456 is a transistor that switches the capacitance value of the floating diffusion unit.

The source follower transistor 430 serving as an amplification unit amplifies the voltage signal converted by the floating diffusion 420 and outputs the same as a pixel signal. The selection transistor 440 serving as a selection unit is an on/off switch, i.e., transistor, for outputting the pixel signal amplified by the source follower transistor 430 to the vertical line 30, and is driven by a selection unit control signal SEL. The source follower transistor 430 and the reset transistor 455 are connected to the common power supply node 460, but they can also be connected to different power supply nodes. In that case, the power supply voltages of the source follower transistor 430 and the reset transistor 455 can be varied.

Further, each of the transistors illustrated in FIG. 2 are formed of an N-type MOS transistor. However, the present technique is not limited to this example, and it is possible to form all the transistors of a P-type MOS transistor. Alternatively, a part of the transistors can be formed of the N-type transistor and the other part of the transistor can be formed of the P-type transistor. The potential of the control signal for controlling each transistor is varied arbitrarily according to the conductor type of each transistor.

For sake of easier understanding, in the following description, the transfer unit control signal TX is referred to as a control signal TX, the reset unit control signal RES is referred to as a control signal RES, the floating diffusion capacitance control signal FDINC is referred to as a control signal FDINC, and the selection unit control signal SEL is referred to as a control signal SEL. Further, references such as SEL, RES, FDINC, and TX are used in some cases to denote the control signals and in other cases to denote the signal line through which the control signal is transmitted.

Figure 3:
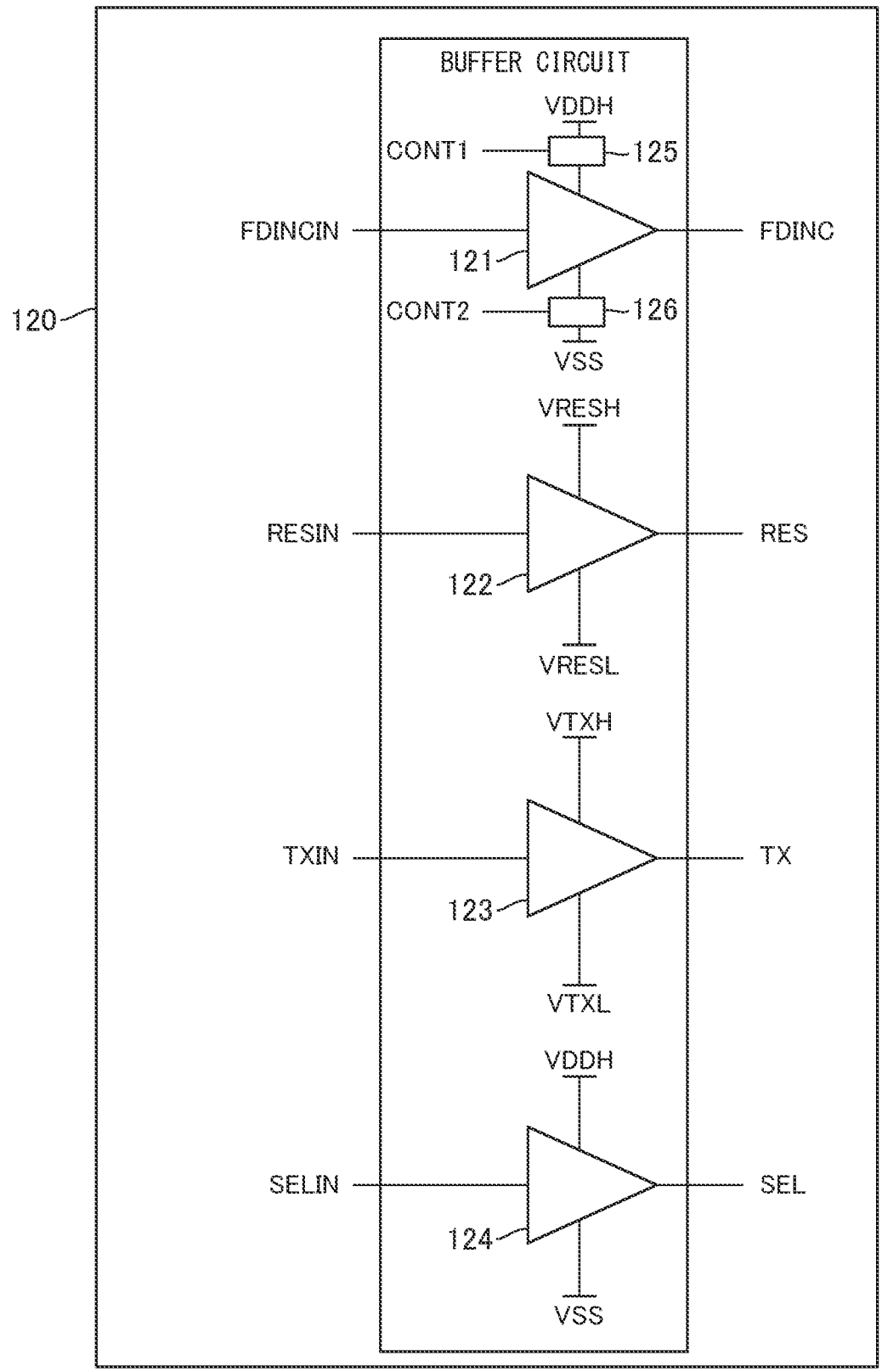
FIG. 3 is a view illustrating a circuit arrangement of an output stage of a pixel control circuit 120 according to the first embodiment.

Next, a circuit arrangement of an output stage of the pixel control circuit 120 will be described with reference to FIG. 3. The figure illustrates an extracted part of the output stage of the pixel control circuit 120, and illustrates a part where four types of control signals FDINC, RES, TX, and SEL are output to one pixel row. The pixel control circuit 120 is equipped with a circuit having a similar arrangement for each pixel row.

Reference numbers 121 to 124 are buffer circuits, and the names of the signals entering each buffer circuit have "IN" attached to the ends of the names of the control signals output from the respective buffer circuits. In the following description, in some cases, a state in which the control signal turns the pixel transistor "on" is referred to as the control signal being set to "high level", and a state in which the control signal turns the pixel transistor "off" is referred to as the control signal being set to "low level".

The buffer circuit 121 outputs the control signal FDINC for switching the on/off of the gain switching transistor 456, and the buffer circuit 121 has a current source circuit 125 and a current source circuit 126 connected thereto. The current source circuit 125 is a control current source whose current quantity is controlled by a control signal CONT1, and the current source circuit 126 is a control current source whose current quantity is controlled by a control signal CONT2. The control signals CONT1 and CONT2 can be signals being output from the TG 161, or they can be generated within the pixel control circuit 120.

A rise time of the control signal FDINC from the low level to the high level is controllable by the current supplied by the current source circuit 125. As described later, in order to increase the rise time of the control signal FDINC, the control signal CONT1 should be set to reduce the current supplied by the current source circuit 125. Further, a fall time of the control signal FDINC from high level to low level is controllable by the current drawn by the current source circuit 126. For example, in order to increase the fall time of the control signal FDINC, the control signal CONT2 is set so that the current drawn by the current source circuit 126 is small.

The buffer circuit 122 outputs the control signal RES for switching the on/off of the reset transistor 455. The buffer circuit 123 outputs the control signal TX for switching the on/off of the transfer transistor 410. The buffer circuit 124 outputs the control signal SEL, i.e., row selection pulse, for switching the on/off of the selection transistor 440.

In the present embodiment, the current source circuit is provided to only the buffer circuit 121 outputting the control signal FDINC, and the current source circuit is not provided in buffer circuits outputting other control signals.

Figure 4:
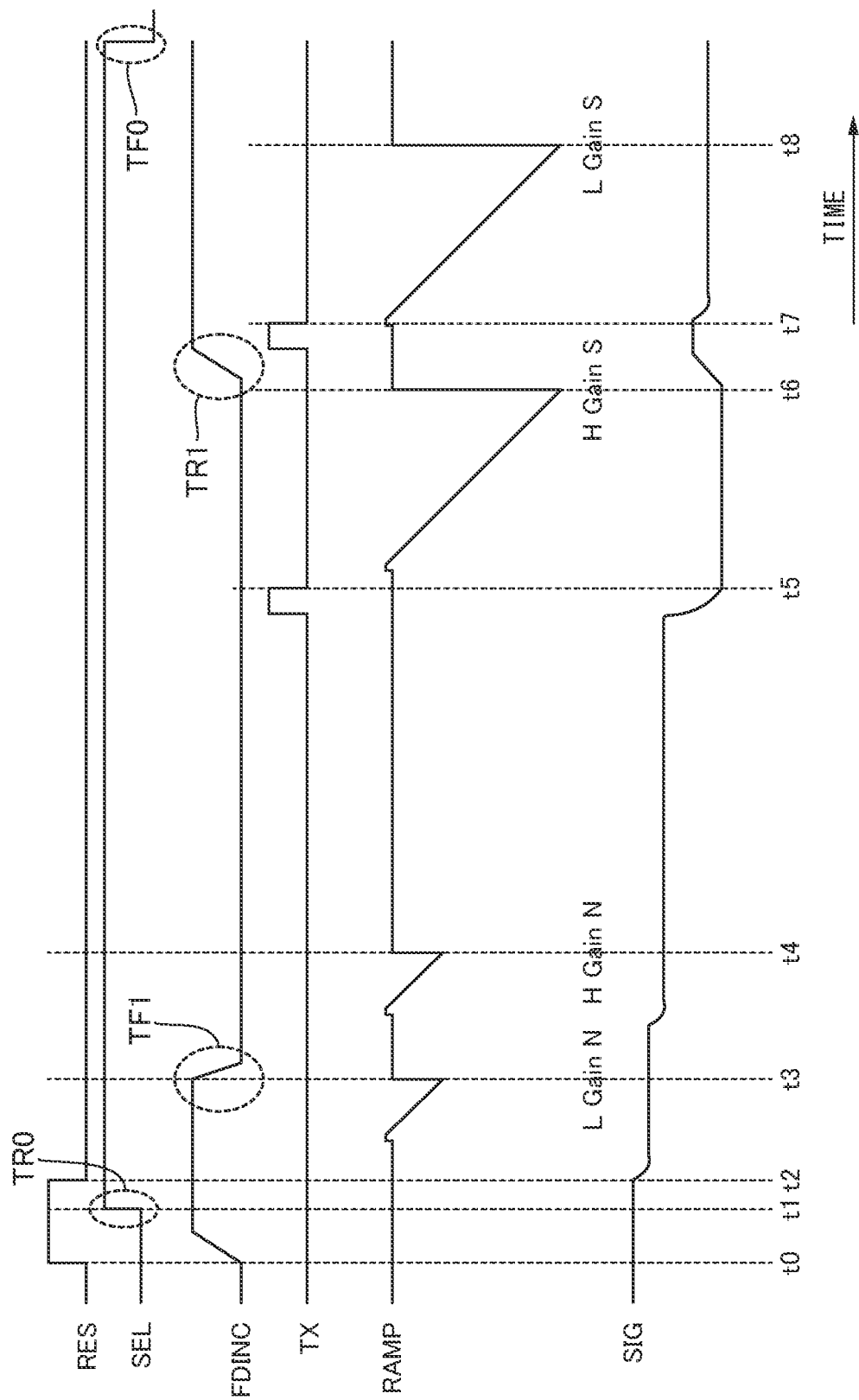
FIG. 4 is a timing chart illustrating a cycle for reading output signals from one row of pixels according to the first embodiment.

Next, with reference to the timing chart of FIG. 4, a temporal transition of each control signal output from the pixel control circuit 120 in the cycle for reading the output signals from one row of pixels will be described. In the drawing, waveforms of the control signal RES, the control signal FDINC, the control signal SEL, and the control signal TX output from the buffer circuit of the row being read of the pixel control circuit 120 are shown. Further, examples of a ramp waveform RAMP output from the ramp signal supply circuit 50 and waveform of a pixel output signal SIG output to the vertical line from the selection transistor 440 of one of the pixels 10 in the row are shown. Every time an output signal is read from the pixel of each row, similar control signals are output from the buffer circuit corresponding to the row being read.

At first, at time to, the control signal RES and the control signal FDINC start transition from low level to high level, and the reset transistor 455 and the gain switching transistor 456 of the pixel 10 are turned on. When both transistors are turned on, the charge of the floating diffusion 420 is reset.

At time t1, the control signal SEL serving as a row selection pulse is set to high level, and the selection transistor 440 of the respective pixels of the corresponding row is turned on. The control signal SEL has a steep waveform whose gradient of rise in the vicinity of an output terminal of the buffer circuit 124 is 30 V/μ sec or more, and a rise time TR0 is small compared to a rise time TR1 of the control signal FDINC. Rise time is defined to be the time that is required for the signal level to change from 10% to 90% of the maximum value, and fall time is defined to be the time that is required for the signal level to change from 90% to 10% of the maximum value.

At time t2, the control signal RES is set to low level, and reset of the floating diffusion 420 of the respective pixels of the corresponding row is cancelled. A signal corresponding to the reset level of the pixel is output as the pixel output signal SIG to the vertical line 30 via the source follower transistor 430 and the selection transistor 440. At this time, the control signal FDINC is set to high level, so that the gain switching transistor 456 is on, and a storage capacitance of the floating diffusion unit is set to gate capacitance Cinc+storage capacitance Cfd. In other words, a low gain is selected, and a signal LGainN corresponding to the reset level of the pixel in low gain appears as the pixel output signal SIG. The AD conversion circuit 160 compares the signal LGainN with the ramp waveform RAMP, and based on the comparison result, acquires a digital data of the reset level of the pixel in low gain. The digital data is sent to the processing circuit 95 as data for Correlated Double Sampling (CDS).

Next, at time t3, the control signal FDINC is set to low level and the gain switching transistor 456 is turned off. As a result, the storage capacitance is set to the storage capacitance Cfd of the floating diffusion 420, and the conversion gain is switched from low gain to high gain. A signal HGainN corresponding to the reset level of the pixel in high gain is output as the pixel output signal SIG to the vertical line 30. The AD conversion circuit 160 compares the signal HGainN with the ramp waveform RAMP, and based on the comparison result, acquires a digital data of the reset level of the pixel in high gain. The digital data is sent to the processing circuit 95 as data for CDS.

A fall time TF1 in a state where the control signal FDINC is changed from high level to low level can be controlled by the current source circuit 126 of the buffer circuit 121. In the present embodiment, as illustrated, the pixel control circuit 120 is configured such that the fall time TF1 of the control signal FDINC becomes longer than a fall time TF0 of the control signal SEL serving as a row selection pulse.

These control signals are transmitted through a row-direction wiring that commonly connects the pixels arranged in the row direction, wherein each wiring is extended in a similar manner along the row direction, and an approximately same level of wiring resistance and parasitic capacitance are distributed. Parasitic capacitance includes a capacitance of wirings that extend in parallel, and a capacitance accompanying each pixel connected to the wiring, which, in the case of a signal line FDINC, is a capacitance Cgs between gate and source of the gain switching transistor 456 illustrated in FIG. 2. If the fall of the control signal is made steep, the signal waveform deforms as the signal transmitted through the row-direction wiring becomes more distant from the output unit, i.e., buffer circuit, of the pixel control circuit 120, and the waveform of the control signal applied to the pixel may differ depending on the position in the row direction.

As for the control signal SEL, since the transition to the low level starts after completing acquisition, i.e., AD conversion, of the output signal of the corresponding row, until t1, i.e., rise, in the cycle for reading the subsequent row, the potential level of the vertical line is not utilized as a signal. Therefore, even if the fall waveform, i.e., fall time, of the control signal SEL applied to each pixel varies according to the position in the row direction, problems will not easily occur to the read operation.

In contrast, as for the control signal FDINC, after switching the pixel gain from low gain to high gain at time t3, it is necessary to read the reset level in high gain from the respective pixels of the corresponding row. If the fall of the control signal FDINC is made steep, similar to the control signal SEL, the signal waveforms applied to the pixels may differ according their positions in the row direction due to the resistance of the row-direction wiring and the influence of parasitic capacitance. Then, the switching timings of gain will differ between pixels, and the readout conditions of the reset level of the pixels in high gain will become nonuniform among the pixels. Therefore, according to the present embodiment, the fall time TF1 of the control signal FDINC output from the buffer circuit 121 is set to be greater than the fall time TF0 of the control signal SEL output from the buffer circuit 124. Thereby, regardless of the row direction position, the reset level of pixels in high gain can be read out from each pixel with a uniform condition.

After acquiring the digital signal of the reset level in high gain at time t4, at a predetermined timing, the control signal TX is set to high level for a predetermined period of time. The transfer transistor 410 is turned on, and the photocarrier generated by photoelectric conversion at the photodiode 400 is transferred to the floating diffusion 420.

During the period from time t5 to time t6, the pixel output signal SIG read out to the vertical line 30 via the source follower transistor 430 and the selection transistor 440 in the state of high gain is subjected to AD conversion in the AD conversion circuit 160. That is, the ramp waveform RAMP output from the ramp signal supply circuit 50 and the waveform of a pixel output signal SIG output to the vertical line from the selection transistor 440 of the corresponding pixel are compared, and the digital data is acquired. After the control signal TX has become low level at time t5, the photocarrier is accumulated again in the photodiode 400.

Next, at time t6, the control signal FDINC is changed from low level to high level. The gain switching transistor 456 is set to on state, and the storage capacitance of the floating diffusion unit is set to gate capacitance Cinc+storage capacitance Cfd. That is, switching from high gain to low gain is performed.

A rise time TR1 when changing the control signal FDINC from low level to high level can be controlled by the current source circuit 125 of the buffer circuit 121. In the present embodiment, as illustrated, the pixel control circuit 120 is configured such that the rise time TR1 of the control signal FDINC becomes longer than a rise time TR0 of the control signal SEL serving as a row selection pulse. In other words, the circuit is configured such that the rise time TR1 of the control signal FDINC output from the buffer circuit 121 becomes greater than the rise time TR0 of the control signal SEL output from the buffer circuit 124.

Figure 5:
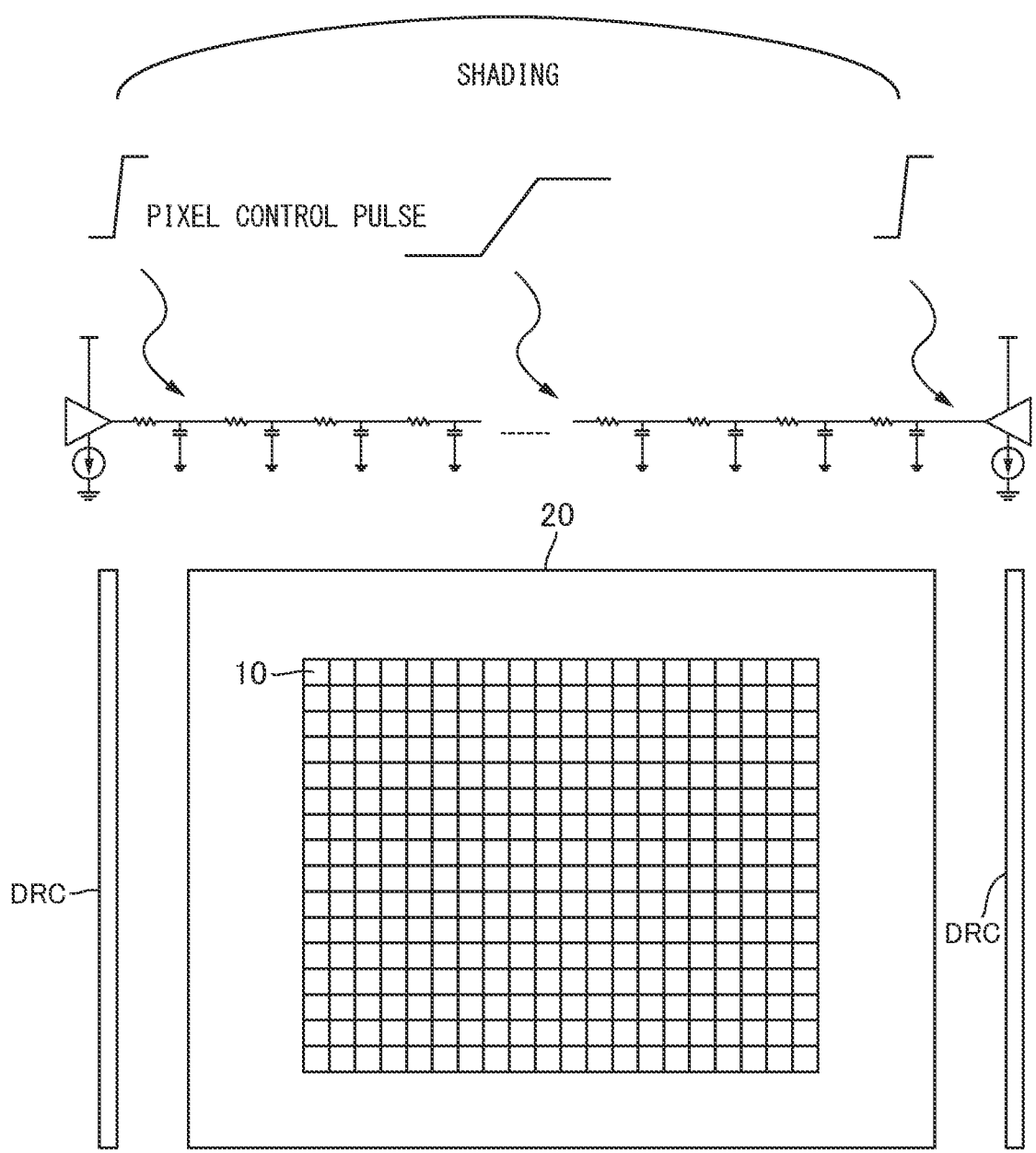
FIG. 5 is a view illustrating a shading that occurs in a photoelectric conversion apparatus according to a reference example.
Figure 6A:
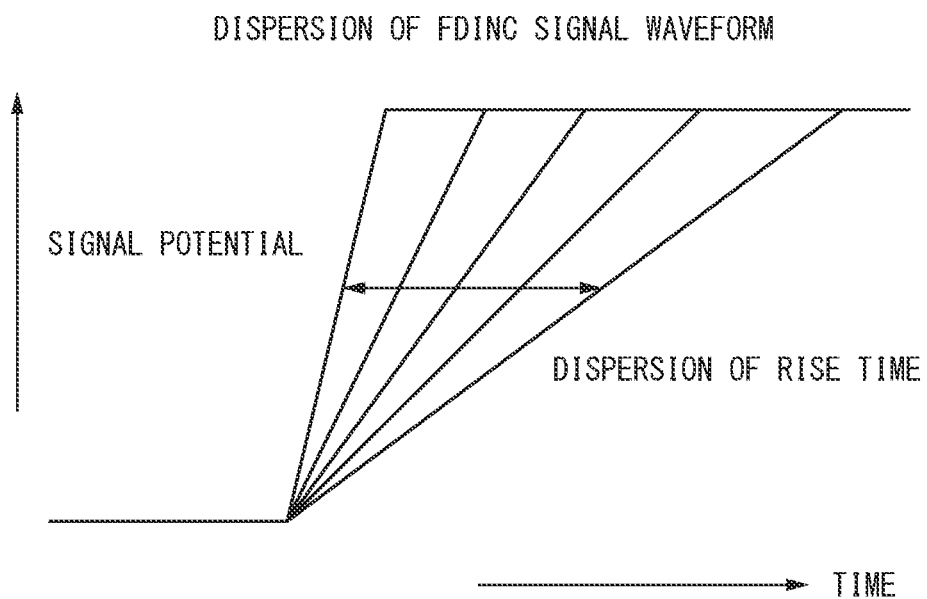
FIG. 6A is a view illustrating dispersion of rise time of a floating diffusion capacitance control signal FDINC that occurs in the photoelectric conversion apparatus according to the reference example.

As a comparison example of the present embodiment, with reference to FIG. 5, a case is illustrated in which the waveform of the control signal FDINC is caused to have a steep gradient of 30 V/μsec or greater, similar to the rise of the control signal SEL. The pixel array 20 in planar view is illustrated in frame format in the lower area of FIG. 5, wherein in the illustrated example, pixel control circuits DRC are arranged on both right and left sides of the pixel array. That is, control signals are designed to be supplied from both sides to the respective row-direction wirings. One row-direction wiring is illustrated in frame format above the pixel array, wherein the wiring has a resistance and a parasitic capacitance distributed thereon, and each end of the wiring is connected to the buffer circuit of the pixel control circuit DRC. If the control signal FDINC that rises steeply is output from the buffer circuit, the rise waveform deforms as illustrated as the distance from the buffer circuit increases, and dispersion of transition time for switching of gain occurs between the pixel close to the buffer circuit and the pixel distant therefrom. That is, as illustrated in FIG. 6A, dispersion of rise time of the control signal FDINC occurs for each pixel, and the rise time is increased in pixels that are more distant from the buffer circuit.

Figure 6B:
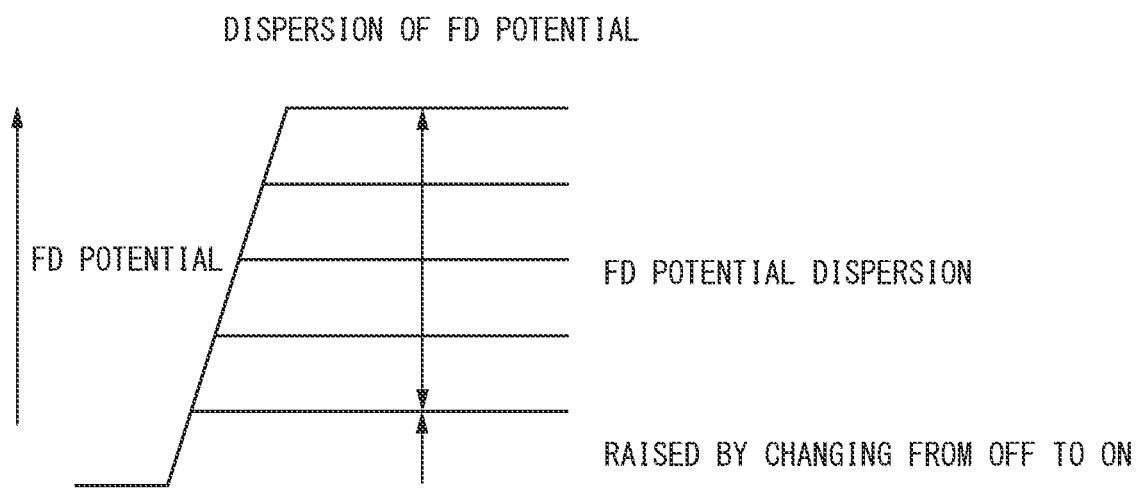
FIG. 6B is a view illustrating dispersion of potential rise quantity of floating diffusion that occurs in the photoelectric conversion apparatus according to the reference example.

In each pixel, a clock feed-through phenomenon occurs during transition from off to on of the control signal FDINC. That is, the potential of the floating diffusion 420 is raised by charge injection through the capacitance Cgs between gate and source (refer to FIG. 2) of the gain switching transistor 456. If the rising of the control signal FDINC is steep, the potential rise quantity, i.e., rising from off to on, of the floating diffusion is great, and if the rising is gentle, the potential rise quantity is small. As illustrated in FIG. 6A, if the rise time is dispersed per pixel, as illustrated in FIG. 6B, the floating diffusion potential, that is, the operating point of the pixel, is dispersed per pixel. Therefore, even if arithmetic processing of S (signal component)-N (reset component) is performed at a following stage circuit, such as the AD conversion circuit or the logic circuit, the operating point differs per pixel, such that a certain level of deterioration of image quality occurs. That is, as illustrated in the upper part of FIG. 5, shading occurs at the center and at both ends of the screen in the row direction.

Figure 7:
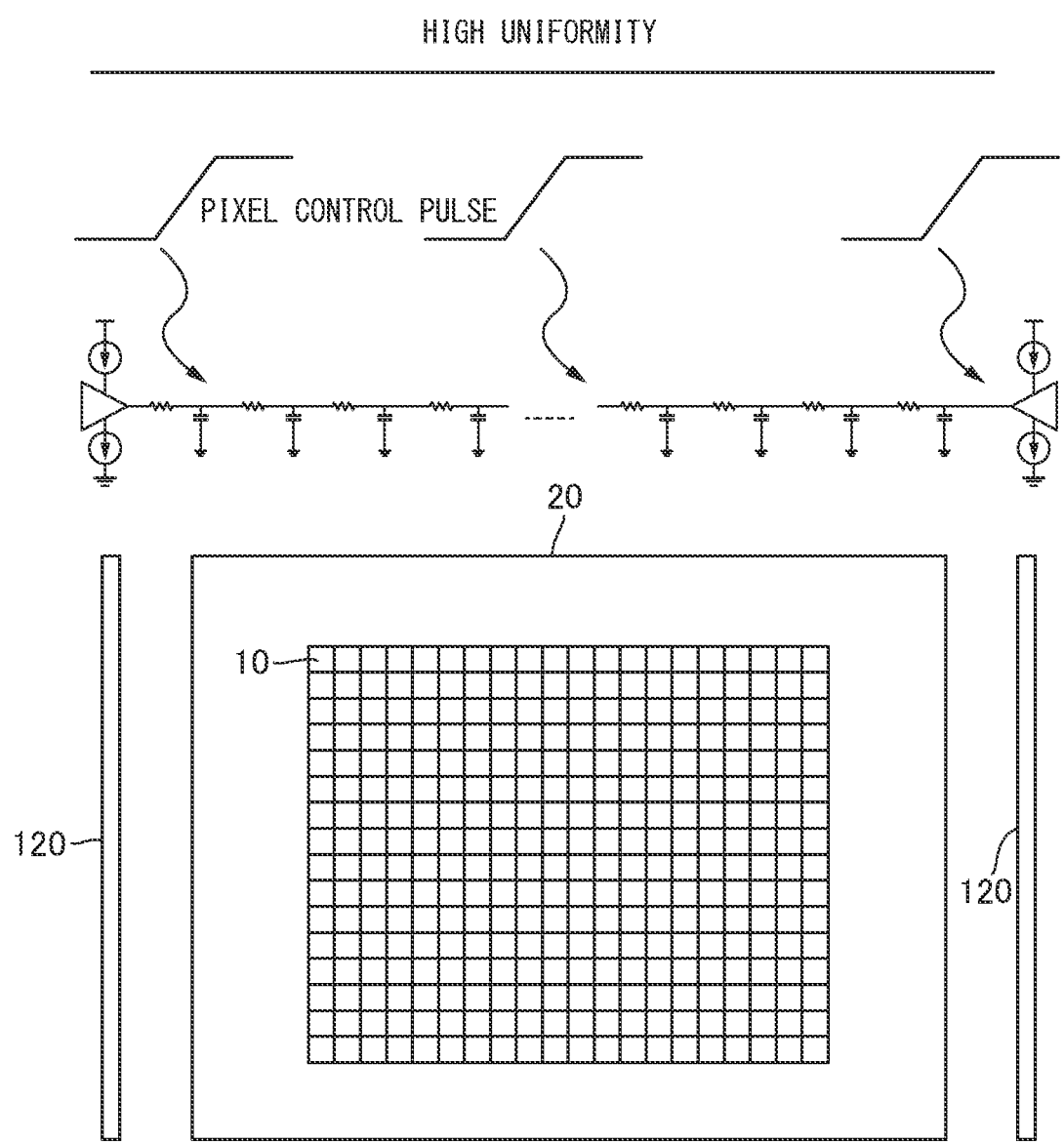
FIG. 7 is a view illustrating that shading is suppressed according to the photoelectric conversion apparatus according to the first embodiment.

In contrast, according to the present embodiment, the occurrence of shading can be suppressed effectively. With reference to FIG. 7, an example is illustrated in which the waveform of the control signal FDINC is set to have a gradient of less than 30 V/μsec smaller than the rising of the control signal SEL. The pixel array 20 in planar view is illustrated in frame format in the lower area of FIG. 7, wherein in the illustrated example, pixel control circuits 120 are arranged on both right and left sides of the pixel array. That is, control signals are designed to be supplied from both sides to the respective row-direction wirings. One row-direction wiring is illustrated in frame format above the pixel array, wherein the wiring has a resistance and a parasitic capacitance distributed thereon, and each end of the wiring is connected to the buffer circuit of the pixel control circuit 120. The control signal FDINC that has a great rise time is output from the buffer circuit, such that the deformation of the rising waveform being transmitted through the row-direction wiring is small, and the differences in waveforms that occur between pixels arranged close to the buffer circuit and pixels far therefrom are suppressed. Therefore, the dispersion of transition time for switching of gain and rising of potential by clock feed-through phenomenon are suppressed, such that an image signal having high uniformity with suppressed shading can be obtained, and the effective dynamic range can be expanded. An example has been illustrated in which the pixel control circuits DRC are arranged on both right and left sides of the pixel array, but even in a case where the pixel control circuit DRC is arranged on only one side of the pixel array, a similar problem occurs. That is, if the control signal FDINC has a steep waveform as described above, dispersion of transition times of switching gains occurs between the pixel arranged near the buffer circuit of the pixel control circuit DRC and the pixel arranged distant therefrom. In contrast, in a case where the control signal FDINC has a waveform having a small gradient as described above, the difference in the waveforms that occur between the pixel arranged near the buffer circuit and the pixel arranged distant therefrom is suppressed. Therefore, the above-described effect can be obtained even in a case where the pixel control circuit DRC is arranged on only one side of the pixel array.

Returning to FIG. 4, during the period from time t6 to time t7, the control signal TX is set to high level for a predetermined period of time, the transfer transistor 410 is turned on, and the photocarrier generated by photoelectric conversion at the photodiode 400 is transferred to the floating diffusion 420. Voltage corresponding to the photocarrier signal appears on the vertical line via the source follower transistor and the selection transistor. As described above, the control signal FDINC is already changed to high level, and the conversion gain is set to low gain, such that the output signal at low gain appears on the vertical line. In FIG. 4, the control signal TX is set to high level for a predetermined period of time during the period from time t6 to time t7, bit it can also be maintained at low level. In that case, the exposure timings corresponding to the high gain signal and the low gain signal can be made the same. Meanwhile, as illustrated in FIG. 4, within the period from time t6 to time t7, if the control signal TX is set to high level for a predetermined period of time, more signal charges can be read out. Therefore, the sensitivity in low gain signal generation can be improved.

During the period from time t7 to time t8, the pixel output signal SIG read out to the vertical line 30 via the source follower transistor 430 and the selection transistor 440 in the state of low gain is subjected to AD conversion by the AD conversion circuit 160. That is, the ramp waveform RAMP output from the ramp signal supply circuit 50 and the waveform of the pixel output signal SIG output to the vertical line from the selection transistor 440 of the corresponding pixel are compared, and digital data is acquired.

Thereafter, the processing circuit 95 performs a so-called digital Correlated Double Sampling (CDS) processing of respective digital data for high gain and low gain by performing arithmetic operation of the difference between output signal and reset level corresponding to the photocarrier.

As described, by sequentially switching the control signal FDINC from on to off, and from off to on, and performing AD conversion of the output signals, the reset signal component and the optical signal component for high gain and for low gain can be acquired as digital signals. Reading of signals of a wider luminance range is enabled by allowing read out to be performed for high gain and low gain.

According to the present embodiment, transition time from off to on of the control signal FDINC serving as the pixel control signal, or pixel control pulse, is extended by restricting the current being supplied to the buffer within the pixel control circuit. Thereby, a good low gain image data with reduced dispersion per pixel can be obtained. For example, when obtaining one composite HDR image from images of different gains by following stage processing, a high gain image is used for the low luminance side and a low gain image is used for the high luminance side to create the composite image, such that the dynamic range of the image that can be obtained by the solid-state imaging element can be expanded.

It is preferable for the gradient of the rise waveform, when the control signal FDINC output from the pixel control circuit 120 changes from off to on, to be less than 30 V/usec, that is, 3 V is charged during 100 nsec. The current source circuit 125 has been described as being capable of controlling the amount of current variably by the control signal CONT1, but it is not always necessary to adopt a circuit arrangement in which the amount of current can be controlled variably by the control signal. Basically, the circuit should merely be able to limit the current supplied to the output stage so as to increase the rise time of the control signal FDINC to a level capable of suppressing shading. Therefore, the circuit can be a current source circuit adopting an active element such as a transistor, or a simple current limiting circuit adopting a current limiting resistor. In another example, the rise time of the control signal FDINC can be made greater than that of the control signal SEL by using transistors having different L/W as the output stage transistors of the buffer circuit 121 and the buffer circuit 124. The same applies for the control of fall time of the control signal FDINC and the arrangement of the current source circuit 126.

Figure 17:
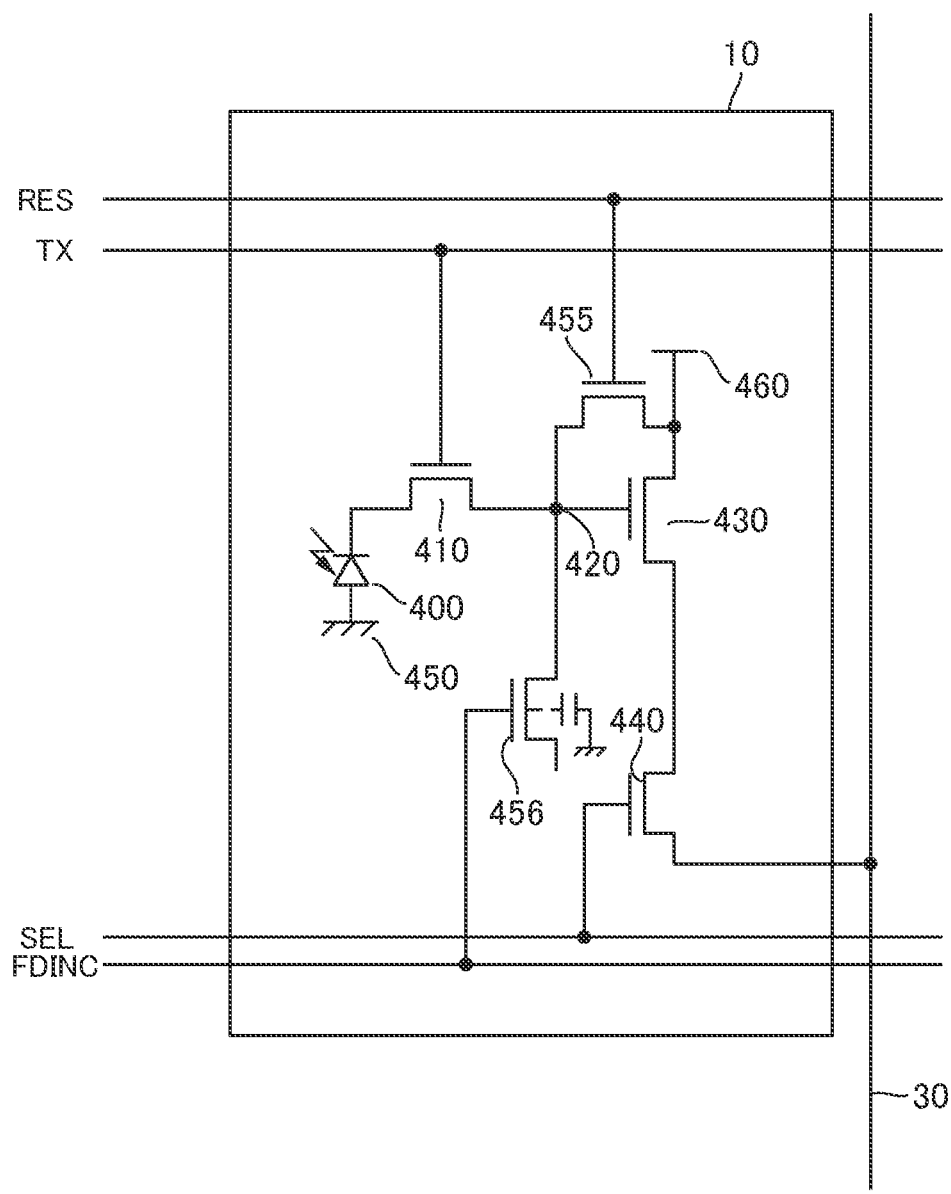
FIG. 17 is a view illustrating another circuit arrangement of a unit pixel according to the first embodiment.

The present embodiment illustrated an example in which the reset transistor 455 and the gain switching transistor 456 are arranged in series in the electric path between the power supply node 460 and the floating diffusion 420. The present technique is not limited to this example, and for example, as illustrated in FIG. 17, the gain switching transistor 456 and the reset transistor 455 can each be connected to the floating diffusion 420. In that case, the reset transistor 455 is configured to be connected to the floating diffusion 420 without interposing the gain switching transistor 456. The arrangement illustrated in FIG. 17 can also be driven by a similar operation as the operation described with reference to FIG. 4. The arrangement illustrated in FIG. 17 can also exert the effects as described in the present embodiment.

Second Embodiment

A photoelectric conversion apparatus according to a second embodiment will be described with reference to the drawings, wherein the items common to the first embodiment are either not described or omitted, and the differences from the first embodiment will mainly be described. The present embodiment differs from the first embodiment in that each pixel includes two gain switching transistors, and that the pixel control circuit supplies floating diffusion capacitance control signals independently to the two gain switching transistors. It is also possible to adopt an arrangement in which each pixel has three or more gain switching transistors and to which floating diffusion capacitance control signals are supplied independently.

Figure 8:
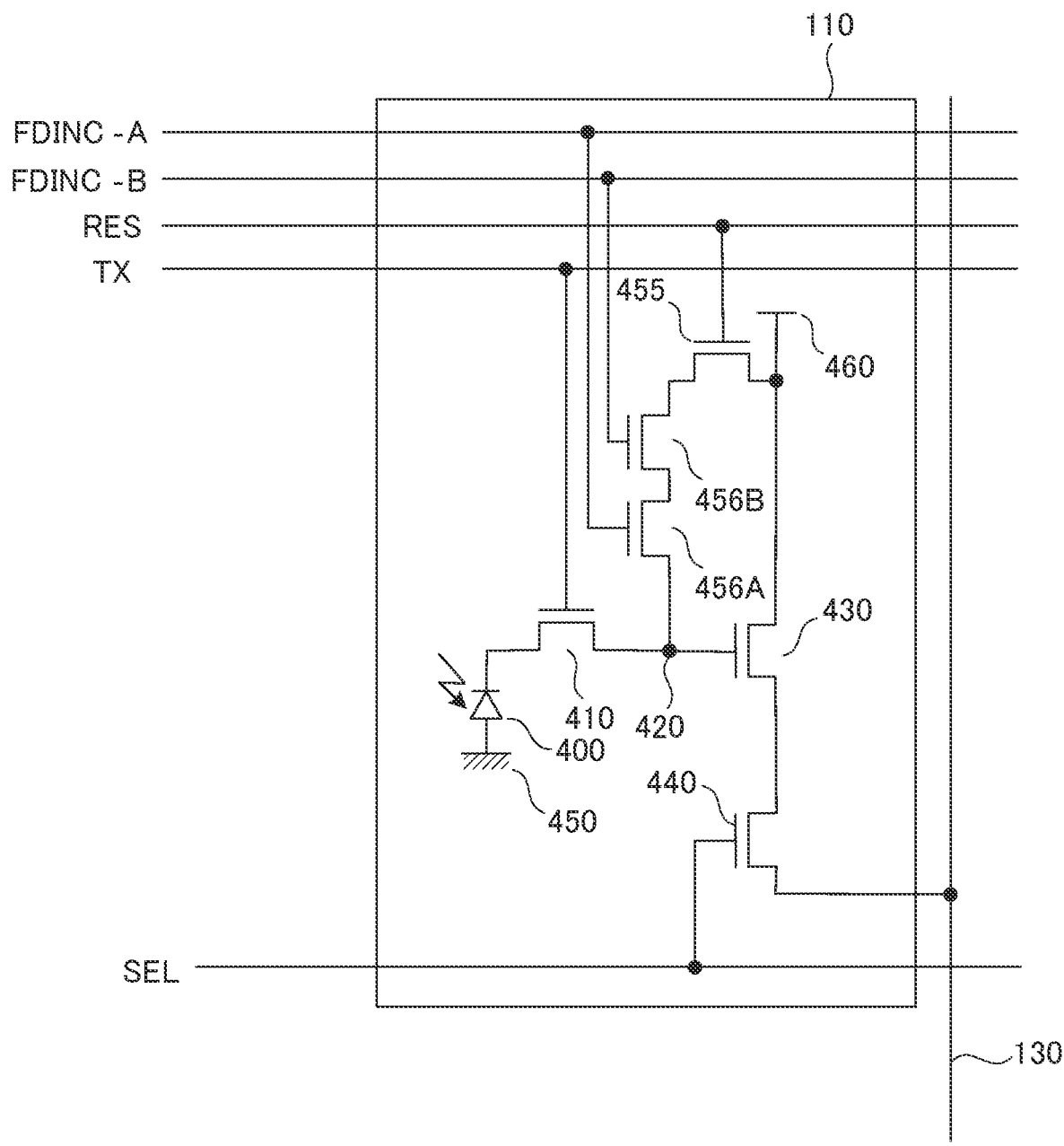
FIG. 8 is a view illustrating a circuit arrangement of a unit pixel according to a second embodiment.

With reference to FIG. 8, a unit pixel according to the present embodiment will be described. FIG. 8 illustrates a circuit arrangement of a pixel 110, but other pixels constituting the pixel array also adopt similar circuit arrangements. The pixel 110 includes the photodiode 400, the transfer transistor 410, the floating diffusion 420, the source follower transistor 430, the selection transistor 440, the GND node 450, the reset transistor 455, a gain switching transistor 456A, a gain switching transistor 456B, and the power supply node 460.

The gain switching transistor 456A is driven by a control signal FDINC-A, and the gain switching transistor 456B is driven by a control signal FDINC-B. For example, when resetting charge of the floating diffusion 420, the reset transistor 455, the gain switching transistor 456A, and the gain switching transistor 456B are turned on simultaneously, and the floating diffusion 420 is connected to the power supply node 460.

The present embodiment adopts a configuration in which, when reading signals, the on/off of the gain switching transistor 456A and the gain switching transistor 456B are switched so as to switch the voltage conversion gain between three levels. FIG. 12 is a table illustrating a relationship between the combination of high (H) and low (L) of floating diffusion capacitance control signal and a voltage conversion gain.

For example, if both the control signal FDINC-A and the control signal FDINC-B are L, the gain switching transistor 456A and the gain switching transistor 456B will both be off. The gate capacitance of both gain switching transistors are not connected to the storage capacitance of the floating diffusion 420, such that the voltage conversion gain will be ×8. Further, if the control signal FDINC-A is H and the control signal FDINC-B is L, the gain switching transistor 456A will be on and the gain switching transistor 456B will be off. The gate capacitance of the gain switching transistor 456A is connected to the storage capacitance of the floating diffusion 420, and the voltage conversion gain will be ×2. If both the control signal FDINC-A and the control signal FDINC-B are H, the gain switching transistor 456A and the gain switching transistor 456B will both be on. Therefore, the gate capacitances of both gain switching transistors are connected to the storage capacitance of the floating diffusion 420, and the voltage conversion gain will be ×1.

Figure 9:
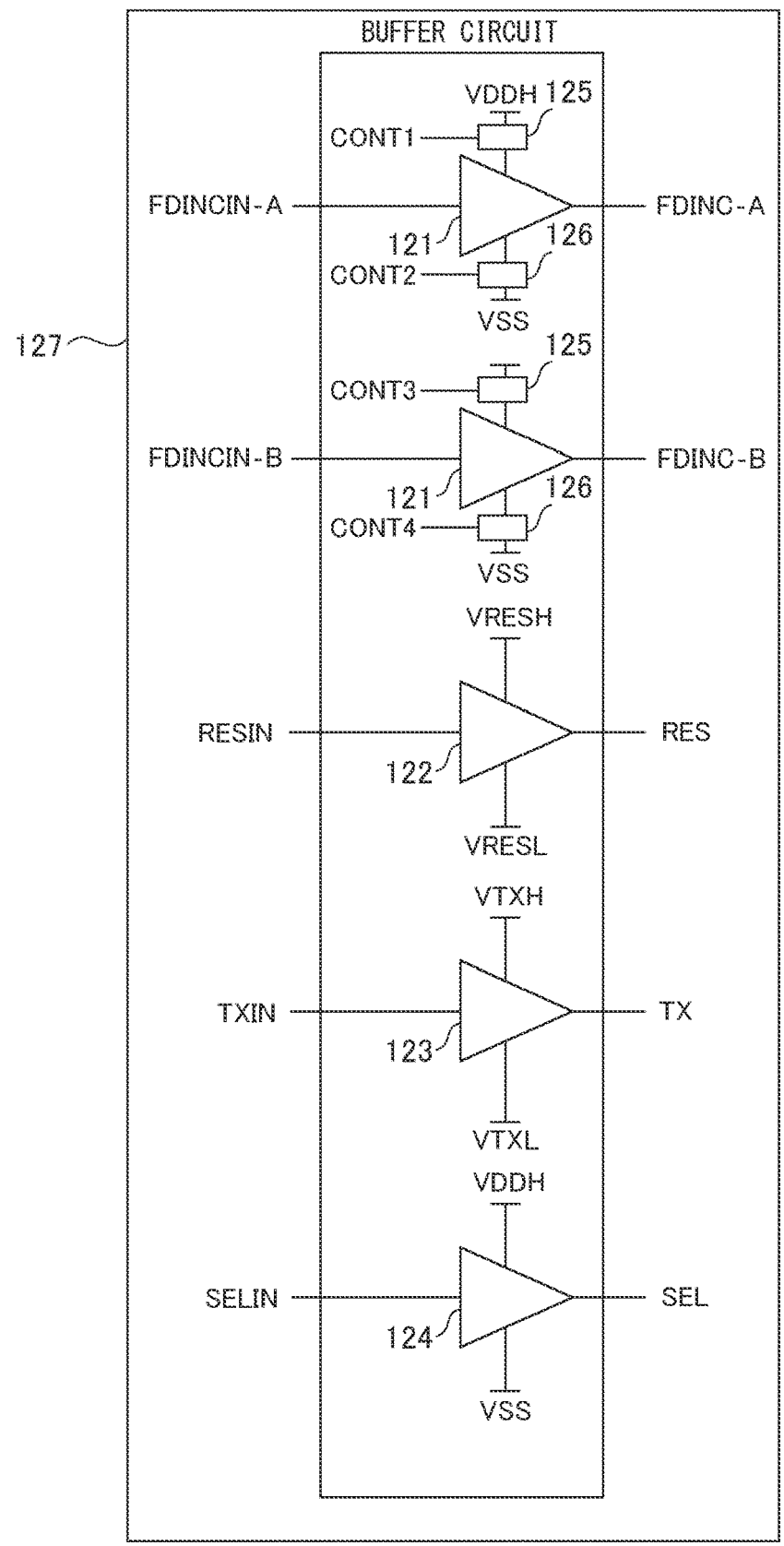
FIG. 9 is a view illustrating a circuit arrangement of an output stage of a pixel control circuit 127 according to the second embodiment.

Next, with reference to FIG. 9, a circuit arrangement of the output stage of a pixel control circuit 127 will be described. The figure illustrates an extracted part of the output stage of the pixel control circuit 127, and shows a part where five types of control signals FDINC-A, FDINC-B, RES, TX, and SEL are output to one pixel row. Reference numbers 121 to 124 are buffer circuits, and the names of the signals entering each buffer circuit have "IN" attached to the end of the names of the control signals output from the respective buffer circuits. The buffer circuits 121 of FDINC-A and FDINC-B each include the current source circuit 125 and the current source circuit 126 to each power supply node. By adjusting the current of the current source circuit, the transition time from off to on and from on to off of the control pulse can be adjusted, similar to the first embodiment.

Next, a read sequence of a case where factors of the voltage conversion gain are set to ×1, ×2, and ×8 are described. FIGS. 10A to 11B are timing charts illustrating a read sequence of one row of a case where the voltage conversion gain is set to various settings. FIG. 10A illustrates a case where one row is read by setting the factor of the voltage conversion gain to ×1 and ×2, and FIG. 10B illustrates a case where one row is read by setting the factor of the voltage conversion gain to ×2 and ×8. Further, 11A illustrates a case where one row is read by setting the factor of the voltage conversion gain to ×1 and ×8, and FIG. 11B illustrates a case where the voltage conversion gain is read by setting the factor to ×8 and ×8.

The rise time/fall time of the control signals FDINC-A and FDINC-B serving as pixel control signals, i.e., pixel control pulses, is set greater than the rise time/fall time of the control signal SEL not shown. Therefore, similar to the first embodiment, an output signal and a reset level signal with suppressed shading regardless of the row direction position can be read from each pixel. According to the present embodiment capable of switching the gain in three levels, by composing one HDR image by selecting the most suitable gain, the dynamic range of image that can be acquired by the solid-state imaging element can be expanded even further.

Third Embodiment

A photoelectric conversion apparatus according to a third embodiment will be described with reference to the drawings, wherein items that are common to the first embodiment are either not described or omitted, and the differences from the first embodiment will mainly be described. The present embodiment differs from the first embodiment in that each pixel includes a plurality of, eight in the illustrated example, photodiodes and transfer transistors, and that the pixel control circuit supplies transfer unit control signals independently to each of the transfer transistors. The number of photodiodes and transfer transistors included in one pixel is not limited to eight, and can be any other number.

Figure 13:
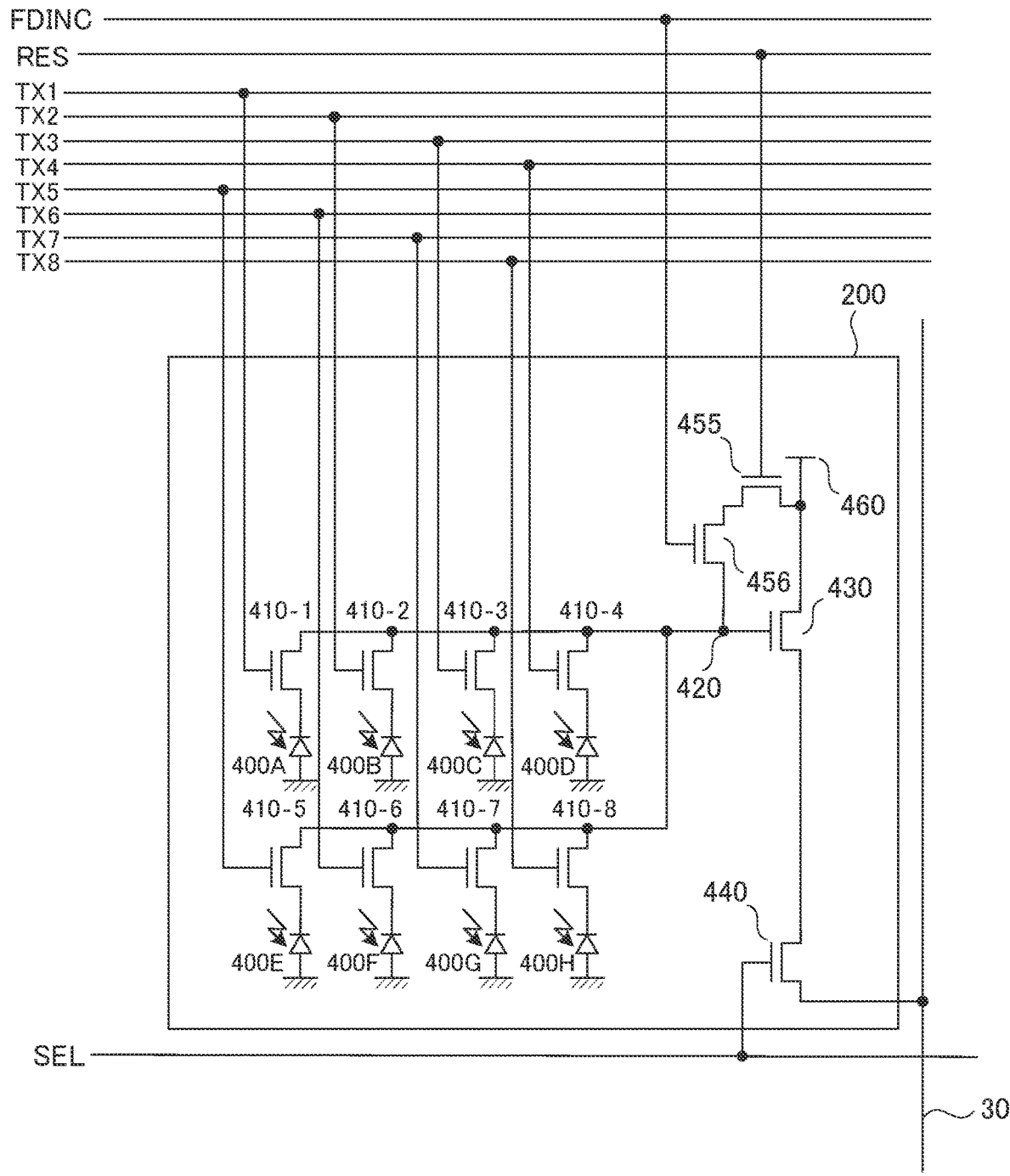
FIG. 13 is a view illustrating a circuit arrangement of a unit pixel according to a third embodiment.

With reference to FIG. 13, a unit pixel according to the present embodiment will be described. FIG. 13 illustrates a circuit arrangement of a pixel 200, but other pixels arranged in a matrix also have similar circuit arrangements. The pixel 200 includes photodiodes 400A to 400H, transfer transistors 410-1 to 410-8, the floating diffusion 420, the source follower transistor 430, the selection transistor 440, the reset transistor 455, the gain switching transistor 456, and the power supply node 460. The photodiodes 400A to 400H are arranged connectably with the floating diffusion 420 through the transfer transistors 410-1 to 410-8. That is, a shared pixel arrangement is configured in which the floating diffusion is shared among a plurality of photodiodes. Control lines TX1 to TX8 for supplying transfer control signals are independently connected to the gates of the transfer transistors 410-1 to 410-8.

Figure 14:
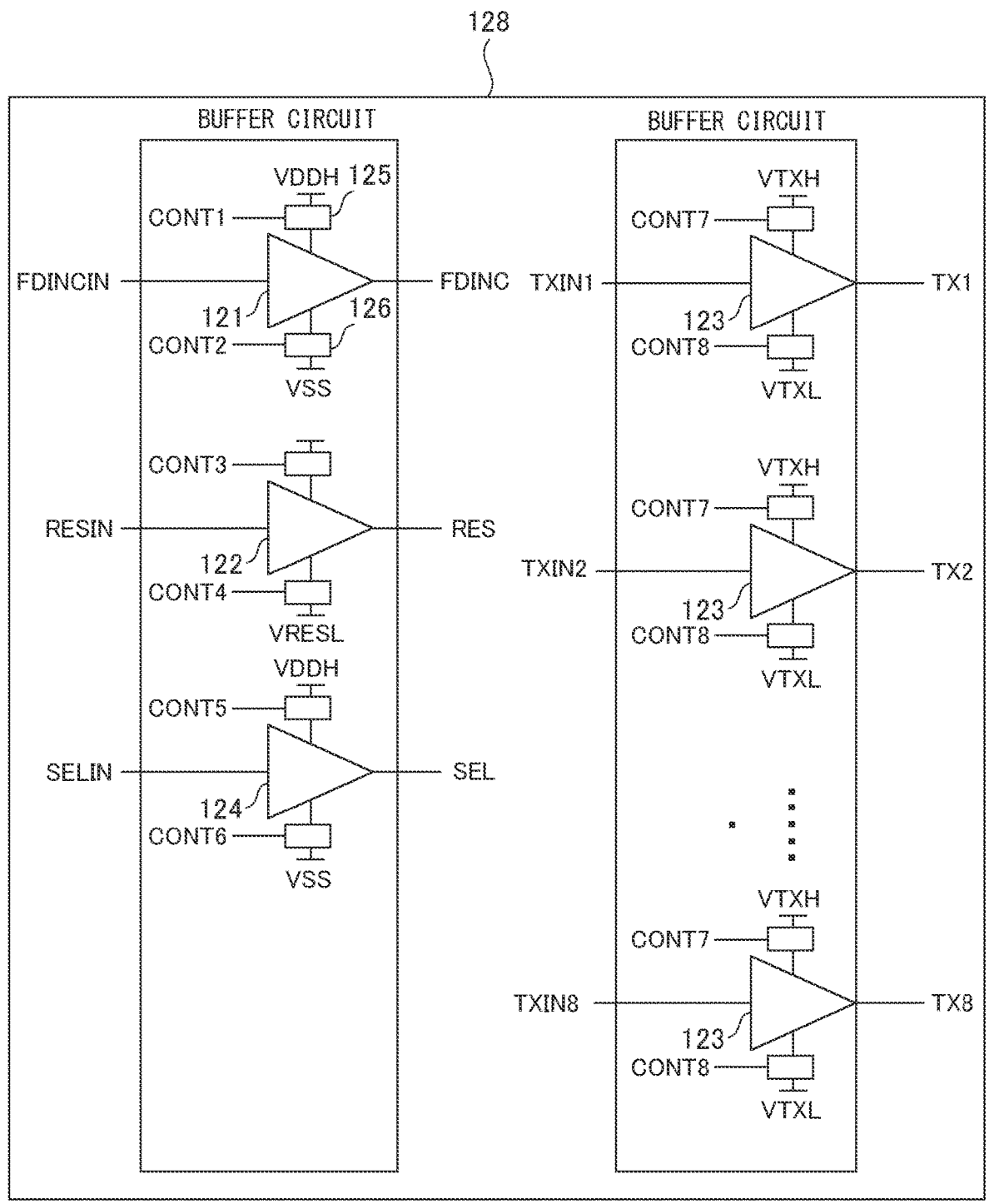
FIG. 14 is a view illustrating a circuit arrangement of an output stage of a pixel control circuit 128 according to the third embodiment.

A circuit arrangement of an output stage of a pixel control circuit 128 according to the present embodiment will be described with reference to FIG. 14. The figure illustrates an extracted part of the output stage of the pixel control circuit 128, and shows a part where eleven types of control signals FDINC, RES, TX1 to TX8, and SEL are output to one pixel row. Reference numbers 121 to 124 are buffer circuits, and the names of the signals entering each buffer circuit have "IN" added to the end of the names of the control signals output from the respective buffer circuits.

According to the pixel control circuit 128 of the present embodiment, not only the buffer circuit of the control signal FDINC but also the buffer circuits of the control signals TX1 to TX8 and the buffer circuit of the control signal RES each have a current source circuit equipped to the power supply node side. That is, the present embodiment adopts a configuration in which the transition time from off to on of the pulse waveforms of the control signal FDINC, the control signals TX1 to TX8, and the control signal RES as pixel control pulses can be set longer than the transition time from off to on of the selection control signal SEL. Further, the present embodiment is equipped with a configuration in which the transition time from on to off of the pulse waveforms of the control signal FDINC, the control signals TX1 to TX8, and the control signal RES can be set longer than the transition time from on to off of the selection control signal SEL.

According to the present embodiment, in addition to the shading suppression effect similar to the first embodiment, suppression of instantaneous current of a reset control signal or suppression of instantaneous current of a transfer control signal is enabled. For example, the present embodiment enables to suppress the instantaneous current when all pixels are reset simultaneously or to suppress the instantaneous current when transfer operations are performed simultaneously in multiple pixels. Thereby, electromigration phenomenon of wirings that occur due to instantaneous overcurrent in a photoelectric conversion apparatus having ultra-multi-pixels, such as breaking of wires and increase of wiring resistance, or malfunctions such as breaking of bonding wires of an IC package, can be prevented.

The present embodiment is equipped with a configuration in which the transition time from off to on of the pulse waveforms of all of the control signal FDINC, the control signals TX1 to TX8, and the control signal RES are set longer than the transition time from off to on of the selection control signal SEL. However, the present embodiment is not limited to this example. The dispersion of floating diffusion potential due to a clock feed-through phenomenon as described in the first embodiment is caused by the change in control signals of transistors having a parasitic capacitance with respect to the floating diffusion. Therefore, the transition time from off to on of the control signal controlling at least one of the transistors having a parasitic capacitance with respect to the floating diffusion is made longer than the transition time from off to on of the selection control signal SEL. Thereby, an image signal having a high uniformity with suppressed shading can be obtained. In other words, according to the present embodiment, the transition time from off to on of at least one control signal among the control signal FDINC, the control signals TX1 to TX8, and the control signal RES can be set longer than the transition time from off to on of the selection control signal SEL. Thereby, an image signal having a high uniformity with suppressed shading can be obtained.

Fourth Embodiment

A photoelectric conversion apparatus according to a fourth embodiment will be described with reference to the drawings, wherein the present embodiment can be executed in combination with the first to third embodiments. In the first, second, and third embodiments, a configuration was adopted in which the rise time of the control signal FDINC was set to be greater than the rise time of the control signal SEL so as to suppress dispersion of potential rise of floating diffusion, i.e., shading, due to the clock feed-through phenomenon.

In addition, according to the present embodiment, a linearity correction processing is performed to correct non-linearity of a luminance signal level, i.e., output signal level, with respect to floating diffusion potential at the processing circuit 95 (FIG. 1) positioned at a following stage of the AD conversion circuit 160. The linearity correction processing is a processing that corrects a non-linearity of sensitivity that occurs by FD potential rising by transition from off to on of the FDINC.

Figure 15A:
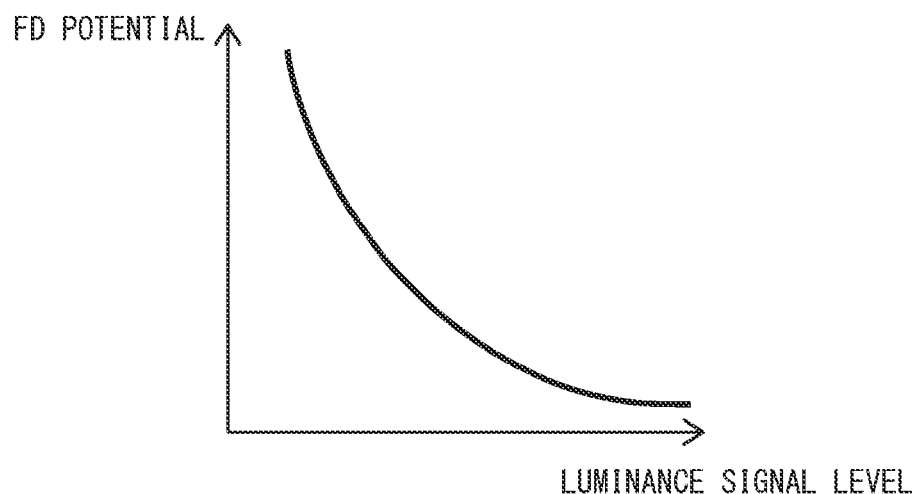
FIG. 15A is a graph illustrating a relationship between rising of FD potential and luminance signal level.
Figure 15B:
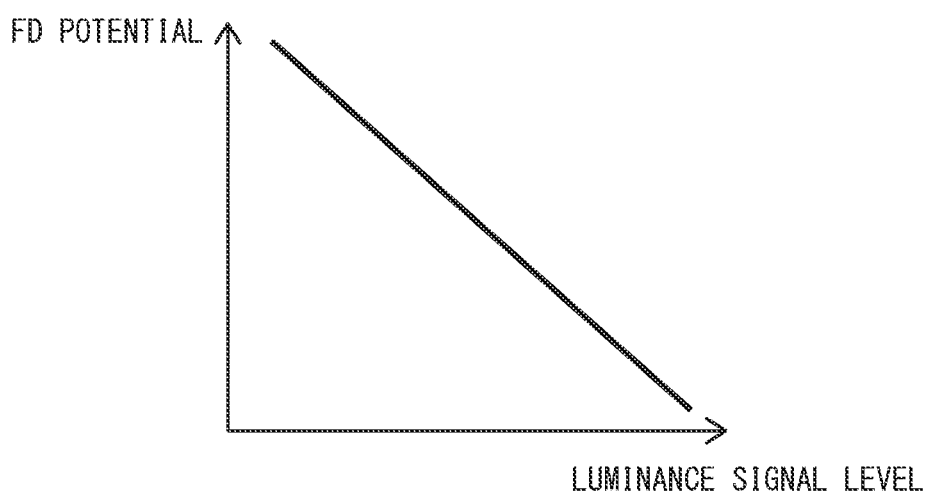
FIG. 15B is a graph illustrating a linearity correction processing according to a fourth embodiment.

FIG. 15A is a graph illustrating a relationship between rising of FD potential and luminance signal level, and it can be recognized that non-linearity has occurred by raising of FD potential by the control signal FDINC. In the present embodiment, as illustrated in FIG. 15B, correction processing for improving linearity is executed by the processing circuit 95, i.e., processing unit. Specifically, a correction table for correcting linearity is acquired in advance, and correction processing is performed to a digital luminance signal after CDS processing. The correction processing can be performed as a software-based processing or a hardware-based processing using a dedicated processing circuit. According to the present embodiment, shading is suppressed, and an image having a high image quality with superior linearity of output signals of respective pixels can be acquired.

Fifth Embodiment

Figure 16A:
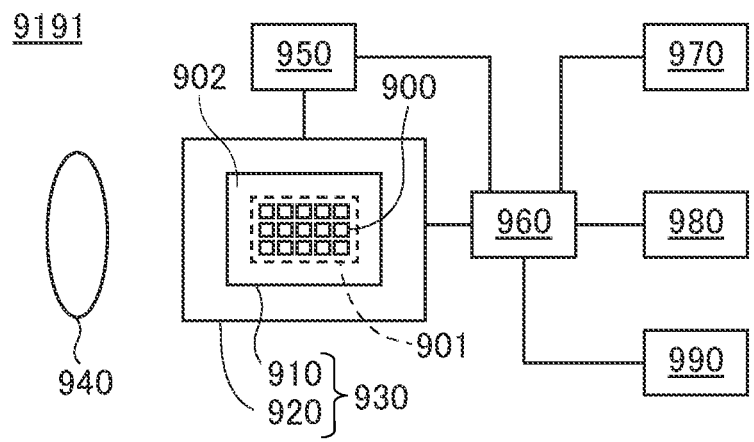
FIG. 16A is a frame format illustrating an equipment including the photoelectric conversion apparatus according to the embodiment.

A system including the photoelectric conversion apparatus according to the present invention will be described as a fifth embodiment. FIG. 16A is a frame format illustrating an equipment 9191 including a semiconductor apparatus 930. The semiconductor apparatus 930 includes, as a semiconductor device 910, a photoelectric conversion apparatus according to one of the embodiments described above. The equipment 9191 including the semiconductor apparatus 930 will be described in detail below.

The semiconductor apparatus 930 can include, in addition to the semiconductor device 910, a package 920 housing the semiconductor device 910. The package 920 can include a base on which the semiconductor device 910 is fixed, and a cover made for example of glass facing the semiconductor device 910. The package 920 can further include a bonding member such as a bonding wire or a bump for connecting the terminals disposed on the base and terminals provided on the semiconductor device 910.

The equipment 9191 can include at least one of an optical device 940, a control apparatus 950, a processing apparatus 960, a display apparatus 970, a storage apparatus 980, and a mechanical apparatus 990. The optical device 940 is provided in correspondence to the semiconductor apparatus 930, and it can be a lens, a shutter, or a mirror, for example. The control apparatus 950 controls the semiconductor apparatus 930. The control apparatus 950 is a semiconductor device, such as an ASIC.

The processing apparatus 960 processes signals output from the semiconductor apparatus 930. The processing apparatus 960 is a semiconductor device, such as a CPU or an ASIC, for constituting an Analog Front End (AFE) or a Digital Front End (DFE). The display apparatus 970 is an EL display apparatus or a liquid crystal display apparatus that displays information, or image, acquired by the semiconductor apparatus 930. The storage apparatus 980 is a magnetic device or a semiconductor device that stores information, or image, acquired by the semiconductor apparatus 930. The storage apparatus 980 is a volatile memory such as an SRAM or a DRAM, or a nonvolatile memory such as a flash memory or a hard disk drive.

The mechanical apparatus 990 includes a moving portion or a propulsion portion, such as a motor or an engine. In the equipment 9191, signals output from the semiconductor apparatus 930 are displayed on the display apparatus 970 or transmitted to the exterior through a communication apparatus (not shown) provided in the equipment 9191. Therefore, the equipment 9191 preferably further includes the storage apparatus 980 or the processing apparatus 960 in addition to a storage circuit and an arithmetic operation circuit provided in the semiconductor apparatus 930. The mechanical apparatus 990 can be controlled based on a signal output from the semiconductor apparatus 930.

Further, the equipment 9191 is suitable for an electronic equipment such as an information terminal having an imaging function, such as a smartphone or a wearable terminal, or a camera, such as a lens interchangeable camera, a compact camera, a video camera, or a surveillance camera. The mechanical apparatus 990 in a camera is capable of driving parts of the optical device 940 for operating zooming, focusing, and shutter functions. Further, the mechanical apparatus 990 in a camera is capable of moving the semiconductor apparatus 930 for vibration control operation.

The equipment 9191 can be a transfer apparatus such as a vehicle, a ship, or an aircraft. The mechanical apparatus 990 in the transfer apparatus can be used as a moving device. The equipment 9191 serving as a transfer apparatus is suitable for the purpose of transporting the semiconductor apparatus 930 or for supporting and/or automating driving or maneuvering operations using the imaging function. The processing apparatus 960 serving for supporting and/or automating driving or maneuvering operations is capable of performing processing for operating the mechanical apparatus 990 serving as a moving device based on information acquired by the semiconductor apparatus 930. Further, the equipment 9191 can be a medical equipment such as an endoscope, a measuring equipment such as a focusing sensor, an analyzing equipment such as an electron microscope, an office equipment such as a copier, or an industrial equipment such as a robot.

According to the embodiment described above, an image having a preferable property can be acquired, such that the value of the semiconductor device can be enhanced. The increase of value described here includes at least one of the following: adding of functions, improvement of performance, improvement of characteristics, improvement of reliability, improvement of manufacturing yield, reduction of environmental load, cutting down of costs, downsizing, and reduction of weight.

Therefore, by adopting the semiconductor apparatus 930 according to the present embodiment to the equipment 9191, the value of the equipment can be enhanced. For example, by installing the semiconductor apparatus 930 in the transfer apparatus, a superior property can be obtained when capturing the image of the exterior of the transfer apparatus or for measuring the external environment thereof. Therefore, in manufacturing and selling a transfer apparatus, a decision to install the semiconductor device according to the present embodiment to the transfer apparatus is advantageous in improving the performance of the transfer apparatus itself. Specifically, the semiconductor apparatus 930 is preferably applied to a transfer apparatus capable of supporting driving operation and/or performing automatic driving of the transfer apparatus using the information obtained by the semiconductor device. Further, the application to a vehicle, a ship, or an aircraft is not limited to application to an equipment used in practice for transportation, but also preferably applied to a drone that performs imaging in air with various objects including inspection of architecture and agricultural facilities, and monitoring of natural phenomenon.

Further, the photoelectric conversion system and the moving body according to the present embodiment will be described with reference to FIGS. 16B and 16C.

Figure 16B:
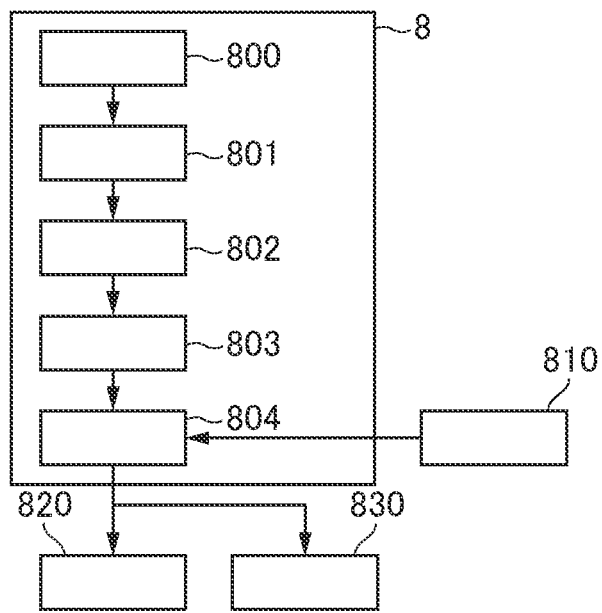
FIG. 16B is a view illustrating one example of a photoelectric conversion system related to an in-vehicle camera according to the embodiment.
Figure 16C:
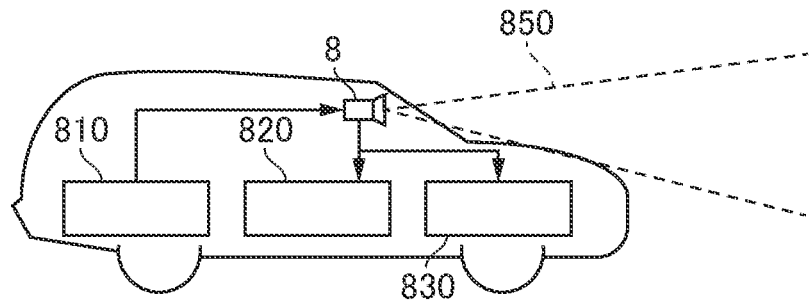
FIG. 16C is a view illustrating the photoelectric conversion system of a case where image of a front direction of a vehicle is captured.

FIG. 16B illustrates one example of a photoelectric conversion system regarding an in-vehicle camera. A photoelectric conversion system 8 includes a photoelectric conversion apparatus 800, wherein the photoelectric conversion apparatus 800 is one of the photoelectric conversion apparatuses according to any one of the embodiments described above. The photoelectric conversion system 8 includes an image processing unit 801 for performing image processing to a plurality of image data acquired by the photoelectric conversion apparatus 800, and a parallax acquisition unit 802 for calculating a parallax, or phase difference of a parallax image, from a plurality of image data acquired by the photoelectric conversion system 8. Further, the photoelectric conversion system 8 includes a distance acquisition unit 803 for calculating a distance to the target object based on the calculated parallax, and a collision determination unit 804 for determining whether there is a collision probability based on the calculated distance. The parallax acquisition unit 802 and the distance acquisition unit 803 are an example of a distance information acquisition unit for acquiring a distance information to the target object. Distance information is information related to parallax, de-focusing, and distance to target object, for example. The collision determination unit 804 can determine the collision probability based on any one of the above-mentioned distance information. The distance information acquisition unit can be realized by hardware designed for dedicated use or by a software module. Further, it can be realized by a Field Programmable Gate Array (FPGA) or an Application Specific Integrated Circuit (ASIC).

The photoelectric conversion system 8 is connected to a vehicle information acquisition apparatus 810, and it can acquire vehicle information such as vehicle speed, yaw rate, and rudder angle. Further, a control ECU 820 which is a control apparatus for outputting a control signal that generates a braking force to a vehicle based on a decision result of the collision determination unit 804 is connected to the photoelectric conversion system 8. The photoelectric conversion system 8 is also connected to a warning device 830 for outputting a warning to a driver based on a decision result of the collision determination unit 804. For example, if there is a high collision probability as the decision result of the collision determination unit 804, the control ECU 820 performs vehicle control to prevent collision and reduce damage, for example, by applying brakes, releasing the accelerator, or suppressing engine output. The warning device 830 outputs a warning to the user, for example, by outputting an alarm sound, displaying a warning information on a screen of a car navigation system, or vibrating the seatbelt or the steering wheel.

According to the present embodiment, image of the circumference of the vehicle, such as in a forward or a rearward direction, is taken by the photoelectric conversion system 8. FIG. 16C illustrates a photoelectric conversion system of a case where image of a frontward direction of the vehicle, i.e., imaging area 850, is taken. The vehicle information acquisition apparatus 810 sends a command to the photoelectric conversion system 8 or the photoelectric conversion apparatus 800. According to this configuration, the accuracy of distance measurement can be improved further.

The above description illustrated an example in which control is performed so as not to cause collision with another vehicle, but the present technique can also be applied, for example, to an automatic driving control performed so as to follow another vehicle, or to an automatic driving control performed so as not to deviate from a car lane. Further, the photoelectric conversion system is applicable not only to vehicles such as automobiles but also to any moving body, or moving device, such as a ship, an aircraft, or an industrial robot. In addition, the photoelectric conversion system is applicable not only to moving bodies but to a wide variety of devices that utilize object recognition, such as an intelligent transport system (ITS).

Modified Example of Embodiment

The present invention is not limited to the embodiments and examples illustrated above, and can be subjected to various modifications within the technical scope of the present invention. For example, the various embodiments described above can be carried out in combination.

The photoelectric conversion apparatus to which the present invention can be applied is not limited to a specific form, and for example, a light receiving portion can be either a front side illumination type or a back side illumination type. Furthermore, it can be a lamination-type photoelectric conversion apparatus in which a semiconductor chip having a light receiving portion and a semiconductor chip having a logic portion are laminated. In that case, the pixel array of the pixel 10 illustrated in FIG. 1 is disposed on one semiconductor chip. The AD conversion circuit 160, the pixel control circuit 120, the TG 161, the processing circuit 95, and the output circuit 100 can be provided on another semiconductor chip. Further, the lamination-type photoelectric conversion apparatus can include three or more semiconductor chips. Examples of the three semiconductor chips include a semiconductor chip having a light receiving portion, a semiconductor chip having a logic portion, and a semiconductor chip having a memory portion. Alternatively, the photoelectric conversion apparatus can have all the components illustrated in FIG. 1 disposed on one semiconductor chip. A case has been illustrated in which the image signal output from the photoelectric conversion apparatus is a digital signal, but the image signal can also be output in the form of an analog signal.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-113654, filed Jul. 15, 2022, which is hereby incorporated by reference herein in its entirety.

What is claimed is:

1. A photoelectric conversion apparatus comprising:
a plurality of pixels arranged in a matrix; and
a control circuit configured to control the plurality of pixels,
wherein each of the plurality of pixels include a photoelectric conversion unit configured to generate a signal charge, a floating diffusion unit, a transfer transistor configured to transfer the signal charge to the floating diffusion unit, and a transistor configured to be electrically connected to the floating diffusion unit,
wherein the control circuit outputs a row selection pulse configured to select the pixel arranged in a row direction, and a pixel control pulse having a rise time longer than a rise time of the row selection pulse, and
wherein the pixel control pulse is entered to a gate of the transistor.

2. A photoelectric conversion apparatus comprising:
a plurality of pixels arranged in a matrix; and
a control circuit configured to control the plurality of pixels,
wherein the control circuit outputs a row selection pulse configured to select the pixel arranged in a row direction, and a pixel control pulse having a rise time longer than a rise time of the row selection pulse, and having a fall time longer than a fall time of the row selection pulse.

3. The photoelectric conversion apparatus according to claim 1, wherein the transistor is a transistor configured to switch a capacitance value of the floating diffusion unit included in the pixel.

4. The photoelectric conversion apparatus according to claim 2, wherein the pixel control pulse includes a control signal that controls a transistor configured to switch a capacitance value of a floating diffusion unit included in the pixel.

5. The photoelectric conversion apparatus according to claim 3, further comprising a processing unit configured to correct a non-linearity of an output signal level of the pixel that occurs by rising of potential of the floating diffusion unit.

6. The photoelectric conversion apparatus according to claim 4, further comprising a processing unit configured to correct a non-linearity of an output signal level of the pixel that occurs by rising of potential of the floating diffusion unit.

7. The photoelectric conversion apparatus according to claim 1,
wherein the pixel includes a plurality of transistors including the transistor,
wherein each of the plurality of transistors is a transistor configured to switch a capacitance value of the floating diffusion unit included in the pixel, and
wherein the pixel control pulse includes a plurality of control signals configured to control the plurality of transistors.

8. The photoelectric conversion apparatus according to claim 2, wherein the pixel control pulse includes a plurality of control signals configured to control a plurality of transistors configured to switch a capacitance value of a floating diffusion unit included in the pixel.

9. The photoelectric conversion apparatus according to claim 1, wherein the transistor is a transfer transistor configured to transfer a signal charge from a photodiode included in the pixel to the floating diffusion unit.

10. The photoelectric conversion apparatus according to claim 2, wherein the pixel control pulse includes a signal that controls a transfer transistor configured to transfer a signal charge from a photodiode included in the pixel to a floating diffusion unit.

11. The photoelectric conversion apparatus according to claim 1,
wherein the pixel includes a first transistor serving as the transistor, a second transistor, a first photodiode, and a second photodiode,
wherein the first transistor is a transistor configured to transfer a signal charge from the first photodiode to the floating diffusion unit,
wherein the second transistor is a transistor configured to transfer a signal charge from the second photodiode to the floating diffusion unit, and
the pixel control pulse includes a plurality of signals configured to control the first transistor and the second transistor.

12. The photoelectric conversion apparatus according to claim 2, wherein the pixel control pulse includes a plurality of signals configured to control a plurality of transfer transistors that are configured to transfer a signal charge from a plurality of photodiodes included in the pixel to a floating diffusion unit.

13. The photoelectric conversion apparatus according to claim 1, wherein the transistor is a reset transistor configured to reset the floating diffusion unit included in the pixel.

14. The photoelectric conversion apparatus according to claim 2, wherein the pixel control pulse includes a signal that controls a reset transistor configured to reset a floating diffusion unit included in the pixel.

15. The photoelectric conversion apparatus according to claim 1, wherein the control circuit includes a current source circuit configured to increase a rise time of the pixel control pulse than a rise time of the row selection pulse in an output unit of the pixel control pulse.

16. The photoelectric conversion apparatus according to claim 2, wherein the control circuit includes a current source circuit configured to increase a rise time of the pixel control pulse than a rise time of the row selection pulse in an output unit of the pixel control pulse.

17. The photoelectric conversion apparatus according to claim 1, wherein the control circuit includes at least one of a current limiting resistor and a transistor configured to increase a rise time of the pixel control pulse than a rise time of the row selection pulse in an output unit of the pixel control pulse.

18. The photoelectric conversion apparatus according to claim 2, wherein the control circuit includes at least one of a current limiting resistor and a transistor configured to increase a rise time of the pixel control pulse than a rise time of the row selection pulse in an output unit of the pixel control pulse.

19. The photoelectric conversion apparatus according to claim 2, wherein the control circuit includes a current source circuit configured to increase a fall time of the pixel control pulse than a fall time of the row selection pulse in an output unit of the pixel control pulse.

20. The photoelectric conversion apparatus according to claim 2, wherein the control circuit includes at least one of a current limiting resistor and a transistor configured to increase a fall time of the pixel control pulse than a fall of the row selection pulse in an output unit of the pixel control pulse.

21. The photoelectric conversion apparatus according to claim 1, wherein a gradient of rise of the pixel control pulse is smaller than 30 V/μsec.

22. The photoelectric conversion apparatus according to claim 2, wherein a gradient of rise of the pixel control pulse is smaller than 30 V/μsec.

23. The photoelectric conversion apparatus according to claim 2, wherein a gradient of fall of the pixel control pulse is smaller than 30 V/μsec.

24. A system comprising:
the photoelectric conversion apparatus according to claim 1; and
a processing apparatus configured to process an image data output from the photoelectric conversion apparatus.

25. A system comprising:
the photoelectric conversion apparatus according to claim 2; and
a processing apparatus configured to process an image data output from the photoelectric conversion apparatus.

26. A photoelectric conversion apparatus comprising:
a plurality of pixels arranged in a matrix; and
a control circuit configured to control the plurality of pixels,
wherein each of the plurality of pixels include a photoelectric conversion unit configured to generate a signal charge, a floating diffusion unit, a transfer transistor configured to transfer the signal charge to the floating diffusion unit, and a transistor configured to be electrically connected to the floating diffusion unit,
wherein the control circuit outputs a row selection pulse configured to select the pixel arranged in a row direction, and a pixel control pulse having a transition time from a signal level to set the transistor as OFF state, to a signal level to set the transistor as ON state, longer than a transition time of the row selection pulse from a signal level to set the pixel as unselected state to a signal level to set the pixel as selected state, and
wherein the pixel control pulse is entered to a gate of the transistor.

27. A system comprising:
the photoelectric conversion apparatus according to claim 26; and
a processing apparatus configured to process an image data output from the photoelectric conversion apparatus.

* * * * *